United States Patent
Katahanas et al.

(10) Patent No.: US 11,853,821 B2
(45) Date of Patent: Dec. 26, 2023

(54) USER INTERFACE FOR SEARCHING AND GENERATING GRAPHICAL OBJECTS LINKED TO THIRD-PARTY CONTENT

(71) Applicants: Atlassian Pty Ltd., Sydney (AU); Atlassian US, Inc., San Francisco, CA (US)

(72) Inventors: Jonathan George Katahanas, Sydney (AU); Abhinav Kishore, Sydney (AU); Vijay Suresh Sutrave, Sydney (AU); James Rotanson, Sydney (AU); Tong Li, Sydney (AU)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 0 days.

(21) Appl. No.: 17/883,041

(22) Filed: Aug. 8, 2022

(65) Prior Publication Data

US 2023/0097010 A1 Mar. 30, 2023

Related U.S. Application Data

(63) Continuation of application No. 17/490,455, filed on Sep. 30, 2021, now Pat. No. 11,416,319.

(51) Int. Cl.
| | |
|---|---|
| *G06F 9/54* | (2006.01) |
| *G06F 9/451* | (2018.01) |
| *G06F 3/0482* | (2013.01) |
| *G06F 16/955* | (2019.01) |
| *G06F 3/0483* | (2013.01) |

(52) U.S. Cl.
CPC ............ *G06F 9/548* (2013.01); *G06F 3/0482* (2013.01); *G06F 3/0483* (2013.01); *G06F 9/451* (2018.02); *G06F 9/452* (2018.02); *G06F 16/9558* (2019.01)

(58) Field of Classification Search
CPC ........ G06F 9/548; G06F 9/451; G06F 3/0482; G06F 9/452; G06F 16/9558; G06F 3/0483
USPC ....................................................... 715/763
See application file for complete search history.

(56) References Cited

U.S. PATENT DOCUMENTS

| | | | |
|---|---|---|---|
| 11,025,742 B2 | 6/2021 | Cheng et al. | |
| 11,288,441 B1* | 3/2022 | Tanner | G06Q 50/26 |
| 11,416,319 B1* | 8/2022 | Katahanas | G06F 9/452 |
| 2017/0329486 A1 | 11/2017 | Li et al. | |
| 2019/0065615 A1 | 2/2019 | Room et al. | |
| 2019/0347589 A1* | 11/2019 | Sullivan | G06F 3/04817 |
| 2020/0151225 A1 | 5/2020 | Rasmussen et al. | |

* cited by examiner

*Primary Examiner* — William D Titcomb
(74) *Attorney, Agent, or Firm* — Brownstein Hyatt Farber Schreck, LLP

(57) ABSTRACT

The disclosure is directed to systems and techniques for executing a documentation application displaying a graphical user interface having a content-creation field configured to receive textual input. A link-creation window may be generated, which facilitates browsing third-party content without leaving a current application. Using the disclosed interface, a user can generate a selectable graphical object that links to third-party content from within the context of the content-creation field interface.

20 Claims, 21 Drawing Sheets

∅ PASTE LINK OR SEARCH RECENTLY VIEWED

≡ TEXT TO DISPLAY

CONFLUENCE    JIRA    GOOGLE    DROPBOX    AGILE    ~228b

∅ FEF    ~222c

≡ TEXT TO DISPLAY

CONFLUENCE    JIRA    GOOGLE    DROPBOX    AGILE

▪ *CHURNED CUSTOMERS*
GOOGLE DRIVE · UPDATED NOVEMBER 01, 2017

▪ *FIRST-USE.SCREENFLOW*
GOOGLE DRIVE · UPDATED JULY 19, 2018

▪ *EDITOR*
GOOGLE DRIVE · UPDATED OCTOBER 14, 2019

▪ *JIRA MOBILE*
GOOGLE DRIVE · UPDATED OCTOBER 22, 2018

▪ *MEET RECORDINGS*
GOOGLE DRIVE · UPDATED JANUARY 16, 2019

∅ FEF COM    ~222d

≡ TEXT TO DISPLAY

CONFLUENCE    JIRA    GOOGLE    DROPBOX    AGILE

▪ *FEF ALL COMMENTS_2019_02_01 - 2019_04_30 (JIRA - ...*
GOOGLE DRIVE · UPDATED JUNE 05, 2019

▪ *FEF ALL COMMENTS_2019_02_01 - 2019_04_30 (JIRA - ...*
GOOGLE DRIVE · UPDATED JUNE 05, 2019

▪ *FEF ALL COMMENTS_2019_02_01 - 2019_04_30 (JIRA - ...*
GOOGLE DRIVE · UPDATED JUNE 05, 2019

FIG. 5C https://subdomain.domain.tld/pages/viewpage.action?pageid=0123456    GO

SPACES  PEOPLE  CREATE  ...

WORKSPACES

Workspace 1 - Marketing
- Document 1 (Blog Post)
- Document 2 (Meeting Notes)
- Document 3 (Sales Target 1-Pager)
- Document 4 (Quarterly Marketing Report)

Workspace 2 - Engineering

Workspace 3 - Finance

TITLE

SUBTITLE

SECTION

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

/salesco/contacts/john smith — 526, 506, 528

Sales Co. Contacts — 532
*Add a Sales Co. Contact Table* — 534
Add a SalesCo Contact Card — 536

FIG. 7

| CITY | COUNTRY | DEPT. | EMAIL | LAST MODIFIED CODE | NAME | PHONE | STREET | TITLE |
|---|---|---|---|---|---|---|---|---|
| Burlington | USA | Unknown Department | jrogers@burlington.com | 2020-12-11 00:38 | John Rogers | (336)555-1234 | 252 S. Ephemeral St. | VP Facilities |
| Unknown City | Unknown Country | Facilities | smith.john@tophotels.com | 2020-12-11 00:25 | John Smith | (312)555-5678 | 9876 N. Fictional Ave., Suite N, Chicago, IL 40601 | VP Facilities |

/salesco/contacts/john.table — 722

To contact:
Do you need more help? Type 'help'

USER INTERFACE FOR SEARCHING AND GENERATING GRAPHICAL OBJECTS LINKED TO THIRD-PARTY CONTENT

CROSS-REFERENCE TO RELATED APPLICATION(S)

This application is a continuation patent application of U.S. patent application Ser. No. 17/490,455, filed Sep. 30, 2021 and titled "User Interface for Searching and Generating Graphical Objects Linked to Third-Party Content," the disclosure of which is hereby incorporated herein by reference in its entirety.

FIELD

The described embodiments relate generally to techniques for generating content and links in a graphical user interface. More particularly, the embodiments relate to systems and techniques for creating selectable graphical objects that link to third-party content. The selectable graphical objects can be created using a dynamic search interface, as described herein.

BACKGROUND

Electronic documents and online content have become ubiquitous resources for product development and professional collaboration. Using an electronic medium, content can be easily shared and published using a variety of techniques. In some cases, it can be useful to link to content created by other teams or content sources to reduce redundancy and improve the efficiency of accessing various electronic resources. However, many traditional link creation techniques require the user to type or enter a specific URL path, which can be prone to error if entered manually or, otherwise, requires that the user switch applications to navigate through the specific electronic organizational scheme of the other party's content. Further, traditional hyperlinks, while useful for redirecting a user, may provide sparse information about the content being linked to, requiring the user to select the hyperlink in order to determine the nature of the content. The systems and techniques described herein can be used to create selectable graphical objects quickly and without having to switch applications or views (e.g., context switch), while also reducing overall redundancy and improving computing efficiency by providing active electronic links between different content sources.

SUMMARY

Some example embodiments are directed to a computer-implemented method of rendering remotely hosted data in a graphical user interface. The computer-implemented method may include instantiating a client application on a client device displaying the graphical user interface having a content-creation field configured to receive textual input via a keyboard of the client device. A command is received to initiate a selectable graphical object within the content-creation field. In response to receiving the command, a provider registry may be queried in order to obtain a set of registered content providers. A link-creation window may be displayed/rendered, which overlaps the content-creation field. The link-creation window may include a link-creation input field and a set of tabs, each tab associated with a respective content provider of the set of registered content providers, each tab configured to display a first list of elements corresponding to content items provided by the respective content provider.

In response to receiving a textual input in the link-creation input field, the textual input may be analyzed and a first application programming interface call to the respective content provider using at least a portion of the textual input may be determined. Using the first application programming interface call, first hosted data may be accessed by the respective content provider, the first hosted data corresponding to one or more additional content items provided by the respective content provider and corresponding to at least a portion of the textual input. Within a respective tab of the link-creation window, a second list of elements is displayed, the second list of elements corresponding to the one or more additional content items provided by the respective content provider. In response to a user selection of an element of the second list of elements, a second application programming interface call may be determined and used to obtain target data from the respective content provider. A selectable graphical object may be rendered within the content-creation field, the selectable graphical object including at least a portion of the target data.

In some cases, the target data is metadata of a content item corresponding to the selected element. In response to a user selection of the selectable graphical object, the user may be redirected to the content item.

In some implementations, the textual input is a first partial textual input and, in response to receiving a second partial textual input, a third application programming interface call is constructed using at least a portion of the second portion of the textual input. Using the third application programming interface call, second hosted data is accessed from the respective content provider. At least one additional element that includes a portion of the second hosted data is displayed in response to the third application programming interface call. The second hosted data may include metadata of a document stored on a resource of the respective content provider. The at least one additional element may include one or more of a title, a name, or a description of the document.

In some cases, the respective tab is a first tab, the respective content provider is a first content provider, and in response to a user selection of a second tab within the link-creation window, a third application programming interface call based on a second content provider associated with the second tab is determined. Using the third application programming interface call, second hosted data may be accessed or obtained from the second content provider, the second hosted data including metadata of one or more content items managed by the second content provider. In response to accessing the second hosted data, a third list of elements corresponding to the one or more content items managed by the second content provider may be displayed within the second tab of the link-creation window.

In some implementations, the selectable graphical object comprises embedded content hosted by the respective content provider. In response to a user selection of an item of the embedded content, additional target data may be obtained from the respective content provider. The selectable graphical object may include a link-type selection control including a list of object control types. In response to a user selection of an object control type of the list of object control types, the display of the selectable graphical object may be modified to correspond to the selected object control type. The list of object control types may include one or more of an inline object type, a card object type, and an embed object type. The content items may include one or more of a cloud-stored document, an issue managed by an issue tracking platform, a project managed by a project management platform, or a page managed by a collaboration platform.

Some example embodiments are directed to a computer-implemented method of generating a selectable graphical object in a graphical user interface. The computer-implemented method may include receiving a command-line input in a content-creation field of a graphical user interface of a client application. In response to receiving the command-line input, a link-creation window may be rendered, which overlays the content-creation field, the link-creation window displaying a first list of elements corresponding to content items provided by a content provider, distinct from a provider of the client application. In response to a user input, a first application programming interface call may be constructed or determined using at least a portion of the user input. Using the first application programming interface call, hosted data hosted by the content provider may be accessed, the hosted data corresponding to a set of content items managed by the content provider. Within the link-creation window list of elements, each element corresponding to a content item of the set of content items managed by the content provider may be rendered or displayed. In response to a user selection of an element of the list of elements, a second application programming interface call may be constructed or determined and used to obtain target data from the content provider. A selectable graphical object may be rendered within the content-creation field, the selectable graphical object including at least a portion of the target data.

BRIEF DESCRIPTION OF THE DRAWINGS

The disclosure will be readily understood by the following detailed description in conjunction with the accompanying drawings.

FIG. 2B depicts a selection of a new tab in the example link-creation window.

FIG. 2C depicts a list of items retrieved in response to a partial textual entry.

FIG. 2D depicts a second list of items retrieved in response to a user selection of an item of the list of items.

FIGS. 5A-5C depict an example graphical user interface used to generate selectable graphical objects.

FIG. 7 depicts another example selectable graphical object.

DETAILED DESCRIPTION

Figure 1:
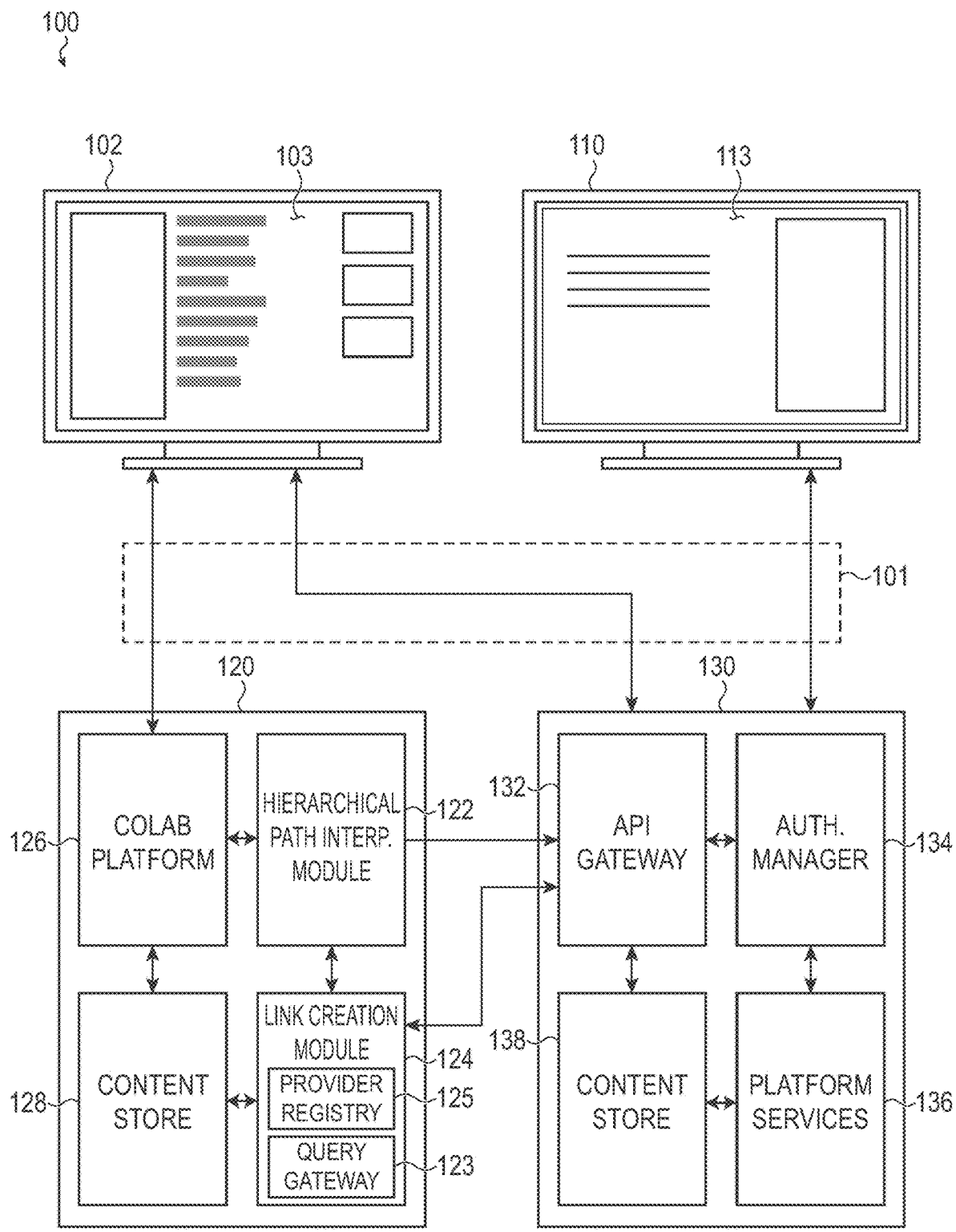
FIG. 1 depicts an example system used for generating selectable graphical objects.

The following description includes illustrations and examples that demonstrate various embodiments of the disclosure. Many of these examples are also illustrated in the accompanying drawings. It should be understood that the following description and examples are not intended to limit the disclosure to one preferred embodiment. Rather, it is intended that the following description covers alternatives, modifications, and equivalents as can be included within the spirit and scope of the disclosure and as defined by the appended claims.

In general, electronic content can be shared or distributed using electronic communication tools that publish or otherwise distribute the electronic content to a group of users. As many content and software providers are transitioning to software as a service (SAAS) platforms, web browsers and web tools can be used to create and share electronic content between teams and various other users. However, sharing content across different platforms or accessing data from other content providers can be cumbersome or difficult. Traditionally, users are required to navigate to a particular webpage or web-hosted content in order to access or view third-party content. In order to facilitate more rapid access to third-party content, users may type or enter a URL into their own content, which may be used to create a traditional hyperlink. However, some current hyperlink creation techniques require that the user access multiple web interfaces or screens, which consumes additional computing resources and may require a complex set of interface selections and interactions, which may lead to error and inoperable or inaccurate hyperlinks. Furthermore, once links are established, some traditional hyperlinks appear as lengthy URL paths or other text that may be practically indecipherable to the user or provide little information about the target content being linked.

The embodiments described herein can be used to facilitate creation of selectable graphical objects that can be inserted into the user's content without having to switch applications, browser tabs, or screens, in order to create the desired link. Furthermore, the selectable graphical objects may be created using data extracted from the content provider, which may give the user a more clear indication of the content being linked. For purposes of the following description, selectable graphical objects may include selectable tiles, buttons, or other similar graphical objects that include metadata or other data extracted from the target content or content provider. As described herein, selectable graphical objects may include a graphic or logo that corresponds to the remotely hosted content as well as select content obtained from the target content or content provider. In some cases, the selectable graphical object is depicted as a contact card having the name and contact information for a particular person or organization, as stored at the linked content host. In other cases, the selectable graphical object may be depicted as an embedded object having an image, chart, video clip, or other graphical element extracted from the target content. Embedded objects may include content that is refreshed when loaded or at a regular interval in order to maintain current content. In some cases, the embedded objects include selectable elements that can be used to interact with the embedded content and/or functionality that is hosted by the content provider.

Embodiments and examples described herein relate to systems and methods for inserting, transforming, and/or formatting third-party data or remotely hosted data into a first-party software platform, such as a collaborative documentation tool. In particular, systems and methods described herein relate to methods for providing a graphical user interface for reviewing and searching third-party content by translating user selections and user entries into application programming interface (API) calls and third-party API endpoints to obtain remotely hosted content without having to navigate from a content creation interface. The systems and methods described herein can also be used to standardize the user experience and by providing a unified search and link creation module that can provide for more efficient navigation of a variety of content providers' remotely hosted content without requiring preexisting knowledge of, or experience with, (or context-switching to) the third-party tool that hosts or controls data or any API thereof.

Various techniques for creating selectable graphical objects and selectable links are described here. In some of the embodiments described herein, a command or other type of user input may be received that initiates a series of link-insertion operations that can be performed from within an editable field or other interface of a current client application. The link-insertion operations may be facilitated or performed by a link-creation module or tool provided as a part of a set of services offered by a collaboration platform. The link-creation module may facilitate a series of automated API calls or other structured queries to a set of registered content providers during a link creation process, which can be used to create the link creation interface, described herein.

As described herein, the link-creation module or tool may cause the display of a floating window or other user-interface element that facilitates the search, review, and selection of content items provided by a content provider without having to navigate away from a current user interface. The link-creation module may query a provider registry to obtain a set of registered content providers. In response to the query, the link-creation module may cause a display of a set of tabs within the floating window, each tab corresponding to a registered content provider. The link-creation module may also generate a list of elements to be displayed under each of the available tabs, the elements corresponding to content items or objects that are available at each respective provider. The link-creation module may also generate an interface that includes a text entry field (also called a link-creation input field) which can receive additional text input or search terms from the user. Text entered into the text entry field is used by the link-creation module to construct one or more application programming interface (API) calls to the registered content provider in order to identify additional content items that are likely to correspond to entered text. A list of elements may be displayed in the respective tabs of the floating window, each element corresponding to a content item identified by the link-creation module.

The link-creation module may be adapted to receive partial text input and identify potentially relevant content items on the fly or as text is being entered by the user. Specifically, the link-creation module may generate multiple API calls while the user is entering text to further refine the displayed elements or selectable options displayed in the respective tabs of the interface. This allows for a dynamic search that may help guide the user to the desired content.

The link-creation module may also display a partial listing of directories or content item groupings to assist the user in an efficient and intuitive navigation of the third-party content. The directories or item groupings may be defined by item category and/or file-structure location provided by the third party. In some cases, the partial listing is generated by the link-creation module in order to provide a uniform appearance and navigational flow that is somewhat independent of third party content providers. This functionality also allows for potentially efficient usage of the limited space provided in the floating window by presenting as many relevant items in a current view, as possible, thereby reducing the need to scroll through a list having a length that exceeds the length of the tab region.

The link creation module, through a series of API calls or other queries directed to the various content providers, may construct a full link path that specifies a target object or remotely hosted content item. As described herein, the full link path may be associated with a selectable graphical object that is rendered in the content-creation field. Also as described in more detail herein, the selectable graphical object may have one of a number of different formats depending on the nature of the target object. A link-type selection control may also be provided, allowing the user to specify and/or change the type of selectable graphical object or link. Example selectable link types include a card or bar selectable object including a brief description of the target extracted from the target object; an embedded content selectable object having visual content that is extracted from the target object, or a provider-defined or user-defined selectable object having a combination of visual and descriptive elements, all or some of which are obtained from the target object.

The following examples are provided with respect to a collaboration platform, like a wiki documentation platform or issue tracking platform. However the following examples can be extended to a range of different content creation tools and can be applied to a range of applications having a content creation or editable content field in which the user is able to dynamically create digital content. Also, as described in the following examples, the link-insertion module may be invoked using one of a number of different techniques including a dedicated selectable control integrated with the graphical user interface of the client application, a plug-in control feature, a command-link control, or any number of other techniques that can be used to receive user input.

These and other embodiments are discussed below with reference to FIGS. 1-13. However, those skilled in the art will readily appreciate that the detailed description given herein with respect to these Figures is for explanatory purposes only and should not be construed as limiting.

FIG. 1 depicts an example system 100 for creating selectable graphical objects that link to external content. The system 100 may be used to quickly access third party content or, in some cases, contact information or entity information from a customer relationship management (CRM) system.

In particular, systems and methods described herein with respect to system 100 and other examples relate to methods for translating application programming interface (API) calls to third-party CRM API endpoints for structured data into a natural language, hierarchical path structure.

As a result of the architectures and methods described herein, a user of a first-party software platform, such as a service desk platform, an issue tracking platform, or a documentation tool, can more quickly access use specific customer, client, or vendor data regardless of the context in which a need for such data arises. As depicted in FIG. 1, the system 100 may include a client device 102 executing a client application that is configured to generate a graphical user interface 103. Using the techniques and systems described herein, accurate link creation may be performed from within the graphical user interface 103 of the client application without requiring the user to toggle or switch between applications, tabs, or screens, also referred to as "context switching."

As described herein, the graphical user interface 103 provided by the client application instantiated on the client device 102 may include an editable field that is provided by a document editor, collaboration tool, or other content creation platform. The client application may be provided by a Web browser, dedicated application, or other similar software application that is configured to access content and develop new content for one or more collaboration platforms 126 provided by the hosted platform services 120. As described herein, the client application may be configured to access the content store 128 of the hosted platform services 120 in order to provide the functionality related to one or more of the collaboration platforms 126 supported by the hosted platform services 120. The collaboration platforms 126 may include a documentation platform or content creation platform configured to allow for enterprise-wide content creation (e.g., Confluence from Atlassian), an issue tracking platform configured to create and monitor tasks, issues, or tickets (e.g., Jira and Jira Service Desk from Atlassian), or other collaboration or productivity-focused platforms.

The hosted platform services 120 may also include a link-creation module 124 that can be used to create custom selectable graphical objects without leaving the context or current view of the graphical user interface 103 of the client device 102. As described herein, the link-creation module 124 may cause the display of a link-creation window or interface that is overlaid or displayed within the visual context of the graphical user interface 103. The link-creation module 124 may include a query gateway that is configured to facilitate navigation of third-party content provided by a content provider like the external platform services 130 depicted in FIG. 1. The external platform services 130 may be associated with a separate third-party platform that hosts content including documents, images, audio and/or video content, contacts, project management content, issue or ticket content, or other content that is hosted remote to the hosted platform services 120 using a distinct application or cloud-based interface.

The link-creation module 124, as described with respect to the various examples herein, generates a dynamic interface that includes items or elements that are generated in response to a series of API calls or other structured queries to the external platform services 130. Specifically, the link-creation module 124 may cause the display of a floating window that includes a link-creation input field and a list of elements or items that correspond to content or data objects provided by a respective content provider offering an external platform service 130. As the user enters text into the link-creation input field, a query gateway of the link-creation module 124 generates or formulates API calls to the external platform service 130 in order to obtain data associated with one or more available items or objects that correspond to the partial or full text entry provided in the link-creation input field. Based on the data obtained from the external platform service 130, the link-creation module 124 may generate a list of elements that correspond to the hosted content or items that are available. In some cases, the elements displayed by the link-creation module 124 are listed on separate tabs, each tab associated with a different content provider. By navigating through the displayed tabs and elements of the floating window interface, the user can dynamically create a selectable graphical object for insertion in a content-creation field of the graphical user interface 103.

In general, the various content providers associated with an external platform service 130 are registered with a query gateway of the link-creation module 124 or some other aspect of the hosted services 120. In one example, the link-creation module 124 is able to access a provider registry that includes a listing of content providers that are compatible with the operation of the link-creation module 124. Typically, a registered content provider will provide one or more target paths to the external platform service along with a set of application programming interface (API) commands or other structured query schema that are compatible with the external platform service 130. The provider registry may store or provide access to both the link paths and a library of API or other structured query commands. The API commands may include traditional REST API commands, Graph QL commands, Sequel Query Language (SQL), Jira Query Language (JQL) or other structured programming interface schema. The provider registry may include a resolver or command interpreter module that is configured to translate or adapt requests from the link-creation module 124 into an API call that is supported by the external platform service 130. As shown in FIG. 1, the external platform service 130 typically includes an API gateway or module 132 that is configured to service the API calls made by or on behalf of the link-creation module 124.

In addition to or as an alternative to the link creation module 124, the hosted platform services 120 may also include a hierarchical path interpreter module 122 (also referred to herein as an in-line link creation module, hierarchical path interpreter, or path interpreter module) that is configured to assist the user, through the graphical user interface 103 of the client device 102, in the creation of selectable graphical objects without leaving the context of the graphical user interface 103 of the client application. Generally speaking, the hierarchical path interpreter module 122 can also facilitate the creation of a selectable graphical object or link within a content-creation field similar to the link-creation module 124, discussed above. One difference is that the hierarchical path interpreter module 122 is directed by text or other input provided in-line or directly within the content-creation field (rather than through a text entry field of a separate floating window interface). However, depending on the implementation, the operations and functionality of the hierarchical path interpreter module 122 and the link-creation module 124 may be combined or may operate in concert with each other in order to create selectable graphical objects without switching context away from the graphical user interface 103.

In general, the hierarchical path interpreter module 122 is able to monitor text or command line input from the user (input via the graphical user interface) and interpret partial path or partial command input in order to formulate API calls to an API gateway or module 132 of an external platform services 130 in order to assist and guide the user in completion of the link or path. Similar to the link-creation module 124, the hierarchical path interpreter module 122 is adapted to provide an accurate and dynamic view of the content items provided by a service provider of the external platform services 130.

The hierarchical path interpreter module 122 is configured to receive and analyze partial text entries as the user types them into an editable field or region of the graphical user interface 103. The analysis performed by the link creation module may occur in response to the entry of a command-line character or symbol that designates the textual input as a link insertion command. In some cases, the command-line character, such as a forward slash "/" or a forward slash with one or more designated characters "/L", may be interpreted by the system as a link insertion command. In response to determining that a link insertion command has been entered, the link creation module may begin to analyze partial textual entries as the user enters the textual input. The hierarchical path interpreter module 122 may perform textual analysis on the partial textual entries in order to identify a target content source. In the example of FIG. 1, the target content source may be associated with a hosted service 136 offered by the external platform services 130. In some cases, the hosted service 136 may also be accessible by a URL or other address or path.

In response to identifying the target content source, the hierarchical path interpreter module 122 may formulate one or more API requests to the API gateway 132 of the external platform services 130. The API requests may be specific to the external platform services 130 and, in some implementations, may be determined by the link insertion command, which may indicate a class of target sources to be accessed, which may correlate to a particular API schema or set of predetermined APIs. The API calls generated by the hierarchical path interpreter module 122 may be serviced by the API gateway 132 of the external platform services 130. The API calls may include partial path information, one or more search terms, or other structured or unstructured data that may be used to access data on the external platform services 130.

As shown in FIG. 1, the API gateway 132 may utilize a number of modules and services hosted by the external platform services 130 in order to respond to calls made by the link-creation module 124 or the hierarchical path interpreter module 122. In some cases, the API gateway 132 may authenticate the user and/or the request using the authorization manager 134. In some cases, the API calls include user account information received from the client device 102 that is used by the authorization manager 134 to authenticate the user and allow access to the content store 138 and/or the hosted services 136. The authorization manager 134 may issue a token or other authentication credential that can be used by the link-creation module 124 or the hierarchical path interpreter module 122 to access data and services on the external platform services 130. In some implementations, all data and service requests are routed through the authorization manager 134 to ensure that the API calls are originated from an authenticated source.

In many cases, the user of the client device 102 may need to create an account or register with the external platform services 130 in advance of the link creation operations described herein. In some instances, the client device 102 utilizes a multi-factor authentication as defined by or in accordance with security protocols defined by the external platform services 130. The authentication may also be performed as part of a single-sign on (SSO) or other broadly implemented security protocol, which may be used to authenticate the user of the client device 102 in advance of the link creation operations.

The data and services that are provided by the external platform services may be restricted to users having a registered account (authenticated using one of the techniques described above) and having an appropriate set of permissions, which may be defined by the type or registered account or user-specific access protocols. Generally, for purposes of the following examples, the user may have at least "view" or "read" permission for content displayed or accessible using the link creation tools described herein. Users without an account and/or without the appropriate set of permissions may not be able to use the link-creation techniques to access data that would otherwise be restricted from viewing by that user. Additionally, there may be portions of the content and/or services provided by the external platform services 130 that are available to the public and do not require authentication or a special set of permissions in order to access or view.

With respect to FIG. 1, in response to one or more of the API calls made through the API gateway 132, the link-creation module 124 and/or the hierarchical path interpreter module 122 may receive host data. The host data may be interpreted by the link-creation module 124 and/or the hierarchical path interpreter module 122 in order to generate one or more visual prompts that are displayed in the graphical user interface 103 in order to prompt or suggest additional input from the user. In some cases, the visual prompts include in-line text that is displayed ahead of the cursor position of the graphical user interface, which may suggest to the user a predicted completion of a portion of the link which, in some cases, may include a completion of the link or a final target. In some cases, the visual prompts include a series of selectable options that are presented in a floating window or other graphical element in the graphical user interface 103. In response to the prompts, the user may enter additional textual input either through a keyboard or by selecting one of the visual prompts. This process of interpreting a partial input, calling the external platform services 130 using one or more API calls and displaying prompts, may be repeated multiple times until the complete link path or final target is specified in the command line.

As described herein, once a target is specified, the system may use the retrieved hosted data to create a selectable graphical object that is inserted in the content-creation field and, in some cases, replaces the textual input (if using an in-line link creation technique). The hosted data, obtained using an application program interface, may include additional link path data or target content data, which may be used to complete the link path of the textual input. The selectable graphical object may include a card or tile that includes information identifying the target content source and may include key information obtained from the hosted data. In accordance with the examples provided herein, the link may include a contact name, contact phone number, email address or other similar information associated with a contact stored in the content store 138 of the external platform services 130. Also as described herein, if the hosted data corresponds to multiple items or entries, the selectable graphical object may be presented as a table of items having hosted data displayed in appropriate cells of the table. If the target corresponds to a multimedia item or other similar content, the selectable graphical object may include an embedded link that includes an image, graphic, GIF, or other content that is displayed within the selectable graphical object.

The link-creation module 124 or the hierarchical path interpreter module 122 may also be adapted to interpret a portion of the path text as a format or display command associated with a particular format. For example, a format command may be designated through a period "." or other symbol that can be used to delineate an in-line formatting command. The format or display command may be used to designate whether the hosted data is presented as a card, phone number, name, or other single line format. The format or display command may also specify a table display format, embedded media display format, or other type of format as can be specified by the user. In some cases, the link creation module 124 or the hierarchical path interpreter module 122 automatically detects or determines a type of hosted data and constructs a default format or display command as part of the complete path or line command.

As depicted in FIG. 1, the content available through the external platform services 130 may also be provided through a separate graphical user interface 113 provided by a client application instantiated or executing on the client device 110. In this example, the separate graphical user interface 113 is depicted as being executed on a separate client device for purposes of illustration. However, the graphical user interface 113 may also be executed on the same client device 102, which is providing the other graphical user interface 103. The two graphical user interfaces 110, 113 may be provided by two separate applications or may be provided in different tabs of a shared application, like a browser or other similar application.

The techniques described herein allow the user access and search content that may otherwise be available using the separate graphical user interface 113, but without having to leave the graphical user interface 110. As discussed above, these techniques may allow the user to find, view, and insert content related to third-party content without having to leave a current UI or context, which improves the speed of content creation and improves computing efficiency by reducing the number of user interfaces that need to be generated and may reduce the amount of data that is transmitted over a network in order to find content and create a link or selectable graphical object within the content.

As shown in FIG. 1, the system 100 includes external platform services 130 that is adapted to provide content for third party services and content. The content may be rendered, viewed, and otherwise accessible through the graphical user interface 113. The external platform services 130 includes an authorization manager 134, which is adapted to authenticate users and transactions in order to maintain secure storage and access to the platform services 136 and the associated content store 138. The authorization manager 134 is adapted to authenticate users either through entry of credentials (e.g., a username and password) through the graphical user interface 113 or through a secure token or other similar credential. Token authorization or other similar authorization techniques may be used by the hierarchical path interpreter module 122 and/or the search module 124 in order to access data stored by the content store 138 and/or services provided by the hosted platform services 136.

As described above, the link-creation module 124 and/or the hierarchical path interpreter module 122 may be able to access data and services from the external platform services 130 using a series of API calls, which may be defined by the external platform services 130. In some cases, the external platform services 130 provides a variety of REST API, GraphQL, SQL, JQL, or other API-accessible resources that enable searching and retrieval of data stored in the content store 138. As an example, the API gateway 132 may be adapted to service query resources that return a single result, a set of results, path information, partial path information, and/or information about the organizational structure of the data accessible on the content store 138.

The external platform services 130 may, in some cases, provide cloud-based document storage or other web-enabled service. The external platform service 130 may include a documentation wiki platform (e.g., Confluence offered by Atlassian), an issue tracking platform (e.g., Jira or Jira Service Desk offered by Atlassian), a project management platform, a cloud-based document storage platform (e.g., Google Drive, Dropbox, or Box), video or audio media platform (e.g., YouTube or Spotify) or other network-enabled service or content provider. The external platform services 130 may, in some cases, provide a customer-resource management (CRM) system that is adapted to store sales leads, sales contacts, contact information, customer directories, workflow information, and other data associated with the CRM system. An example CRM system may be Salesforce.com, Monday.com, Insightly.com and other customer-resource or relationship management tools. A typical CRM may enable a sales team to track engagements with key customers or contacts and manage a sales pipeline, develop marketing analytics, and provide other services for a sales or marketing team. While a CRM is used as an example throughout the specification, similar or the same techniques may be applied to a wide range of other systems and platforms. Furthermore, while some of the examples described herein rely on the use of third-party APIs, other implementations may use other techniques to access meta-data or other information retrievable via a URL or other network-addressable locations.

FIG. 1 depicts an example system 100 having multiple computing devices operably coupled by a computer network 101. As shown in FIG. 1, the system includes client devices 102 and 110. The client devices 102, 110 can be any suitable electronic device; examples include a desktop or laptop computing device. In other examples, the client devices 102, 110 may be a mobile device such as a tablet or a cellular phone. It may be appreciated that these example electronic devices are not exhaustive; any suitable device may be a client device as described herein.

The client devices 102, 110 may each include a processor and a memory. The processor may be any suitable computing device or logical circuit configured to execute one or more instructions to perform or coordinate one or more operations on or to digital data. In many embodiments, the processor or processors of the client devices 102, 110 may be a physical processor, although this is not required of all embodiments; virtual components may be suitable in some implementations. Similarly, a memory of the client device 100 may be configured and/or implemented in a number of suitable ways and may be partially or completely virtualized.

In typical examples, the processor of the client devices 102, 110 is configured to access at least one executable asset from the memory of the client devices 102, 110. More particularly, the processor of the client devices 102, 110 may be configured to access a data store portion of the memory to load, into a working portion of the memory, at least one executable asset or executable program instruction. In response to loading the instruction or executable asset into working memory, the processor of the client devices 102, 110 may instantiate an instance of software referred to herein as a client application.

In many embodiments, a client application (also referred to as a "frontend") may be configured to provide client-side functionality of a software platform (a documentation or content creation service or other collaboration platform). More specifically, the client application may be configured to communicably couple to a separate instance of software executing on, and/or instantiated by, a host system or server configured to provide server-side ("backend") functionality of the hosted platform services 120 (e.g., documentation or content creation service). In this manner, a documentation or content creation service is defined in part by a frontend executing/instantiated on a client device and in part by a backend executing/instantiated on a host server of the platform services 120 in communication with the frontend.

In this example, the hosted platform services 120 and external platform services 130 include a host server supporting the backend configured to operate within, or as, a virtual computing environment that is supported by one or more physical servers including one or more hardware resources such as, but not limited to (or requiring) one or more of: a processor allocation; a memory allocation (also referred to as a working memory); non-volatile storage (also referred to as persistent memory); networking connections; and the like.

Further, it may be appreciated that although referred to as a singular "server", a host server supporting the backend may be a cluster of different computing resources, which may be geographically separated from one another. In this manner, because specific implementations may vary, both the host server (of the hosted platform services 120 and external platform services 130) and the client device 102 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

An example implementation of the system 100 of FIG. 1 is described below with respect to FIGS. 2A-4D. While the following screen shots and examples are provided as an illustration of the principles of this disclosure, the examples are not intended to be limiting in nature and merely serve to demonstrate the use of the proposed systems and techniques.

The system 100 described above with respect to FIG. 1 can be used for inserting, transforming, and/or linking to third-party data into a first-party software platform, such as a collaborative documentation tool. In particular, systems and methods described herein relate to methods for translating application programming interface (API) calls to third-party API endpoints for structured data into a natural language, hierarchical path structure, with arbitrary and/or user-specific or user-provided path components. As a result of the architectures and methods described herein, a user of a first-party collaboration platform 126, such as a collaborative documentation tool, can more efficiently access and use third-party data without requiring any preexisting knowledge of, or experience with, (or context-switching to) the third-party tool that hosts or controls data or any API thereof.

More simply, embodiments described herein define a specific graphical user interface that can be deployed from a first-party platform to: (1) search through, and select, a third-party API endpoint; (2) search through and select one or more data transformations that may be applied to structured data returned from the selected third-party API endpoint; and/or (3) search through and select one or more formats or display options for rendering or presenting the (optionally, transformed) structured data.

For example, a user of a documentation tool (example collaboration platform 126) may create a document that the user would like to reference or display some third-party data. As one example, the document created by a user may detail or memorialize a relationship with a particular vendor and the user may prefer to include in that document a telephone number of a representative of the vendor. In this example, the vendor representative's contact information (including the phone number) may be stored in a separate software tool, such as a customer relationship management (CRM) system. The separate software tool may be a cloud-based service 136 that is offered by the external platform services 130.

In a conventional architecture, the user may be required to access and search the CRM system for the vendor representative's information using a dedicated graphical user interface 113. Once the information is found, the user might copy the phone number to the user's clipboard, after which the user may paste the phone number into the document being displayed in a separate graphical user interface 103. After pasting into the document, the user may prefer to reformat the phone number and/or add a linkback/crosslink to the CRM system. As may be appreciated by a person of skill in the art, this conventional process is both time consuming and impermanent. In particular, the user is required to access, operate, and be familiar with two separate software tools (here, the documentation tool and the CRM system) merely to display a small fragment of data from one system in another. In addition, a person of skill in the art may readily appreciate that the copied data is static and may become stale if the vendor's representative changes or the vendor's representative's contact information changes in the CRM system.

Embodiments described herein resolve these and other problems by providing link-creation module 124 which may serve as an abstraction layer, also referred to as a query gateway, implementing third-party API calls. The query gateway provided by the link-creation module 124 can be configured to receive user inputs (whether selections of controls enabled within the link-creation window or plain text entered into a field) and can be configured to provide as output a specifically-formatted API call to an appropriate third-party system. The query gateway can maintain an association database that links terms and concepts (which may be stored as, or may be convertible to, word or phrase vectors) to particular systems and/or particular APIs of those systems. As a result of this architecture, a text input provided by a user into any user editable field can be immediately associated with a particular API call of a particular system, even if that user provides the input in free form without particular formatting, without particular syntax, and/or without using particular trigger words or tags. Similarly, selection of a particular control or displayed item may be associated with a particular API or used to formulate an API call. Thereafter, once an API call to a particular API endpoint has been constructed and/or retrieved by the query gateway, the selected call can be made and the requested data can be retrieved by the plaintext query gateway and returned to the user.

In further embodiments, the query gateway can be further leveraged to process the user input to identify one or more formatting or display preferences and/or one or more data transformations to be performed against the retrieved data. In this manner, a user that provides a text input to a first system can be presented with an option to display data from a second system within the first system, automatically and without requiring intervention by the user.

To continue the example introduced above, the user may type a command line input or otherwise instantiate an execution link-creation module. Within the link-creation module or within the editable field of the current document, the user may type the phrase "insert VENDOR's phone number." The query gateway may receive the phrase as input and identify that the term "phone number" is sufficiently similar (e.g., via vector cosine similarity) to data that may be obtained via an API request from the CRM. For example, the query gateway may associate the term "phone number" with an API call that is able to return a data item "TELEPHONE_NUMBER" stored by the CRM. In addition, the query gateway may identify VENDOR as having a type (e.g., organization name) that is associated with data stored by the CRM accessible via an API call. In response to these determinations, the query gateway can generate a query to the CRM that retrieves the attribute TELEPHONE_NUMBER of the entity VENDOR, and returns that data to the user.

In this example, from the user's perspective, after the user types "insert VENDOR's phone number" into the graphical user interface of the documentation system or the link-creation window, the user may be presented with an option to replace the text "insert VENDOR's phone number" with a link to, or a copy of, the vendor's telephone number as stored in the CRM system. As described herein, the inserted object may be selectable and, in response to a user selection, may redirect the user to the record stored by the CRM or to an interface provided by the CRM having information associated with the respective record.

In other example implementations, the query gateway may define a particular hierarchical plaintext reference language or syntax for obtaining data from one or more third-party tools. For example, to continue the preceding example, the user may type a path in plaintext that cues the query gateway to obtain particular data from the CRM system. For example, instead of typing "insert VENDOR's phone number" the user may type "CRM/Vendor/Contact/Phone." In such implementations, each path component may be rigidly defined by the query gateway or, in other cases, may be conceptually defined by word or phrase vectors as described above. In this manner, a first user who types "CRM/Vendor/Contact/Phone" may be presented with the same options as a second user who types "Customer Relationship Manager/Vendor/Phone Number."

In yet further examples, format preferences can be typed by a user as well. For example, as user may type "insert VENDOR's phone number as link" which may cause the query gateway to transform a plaintext phone number retrieved from the CRM as a tel:// link. As with preceding embodiments, a user that types "CRM/Vendor/Contact/Phone/Link" may be presented with an option to replace that path with a tel:// link to the Vendor's phone number.

These preceding examples are not exhaustive of the various use cases of a system as described herein. More generally and broadly, a system as described herein is configured to serve as an intermediate service between plaintext user inputs/user selections and well-formatted API calls for particular information and data. In this manner, the link-creation module (also referred to as a query gateway) can be leveraged to load data, transform data, and/or display data from any particular system in any other particular system.

In another one example use of the system 100, a customer service agent providing software support to customers may receive a telephone call from an unknown number, from a caller who begins describing a problem the moment the call connects. In order to provide service to the caller, the agent must first identify who the caller is, what software the caller is operating, whether the caller is a VIP, whether the caller should be elevated to a supervisor, what software issue the caller is facing, whether the software issue signals a service level agreement (SLA) compliance problem, and so on. Obtaining, memorializing, and acting on this information (e.g., by searching a CRM) may be particularly challenging while the customer service agent simultaneously devotes attention to listening to the caller.

In this example, as may be appreciated by a person of skill in the art, time is of the essence and the responsiveness with which the agent can address and/or triage the caller's reason for calling directly impacts business reputation, SLA compliance, customer satisfaction, and so on. To address these and other issues, the system 100 of FIG. 1 and other examples described herein may be directed to a simple text-based user interface that can be used from within any editable field of a service desk application: (1) search through, and select, a third-party or first-party CRM API endpoint; (2) search through and select one or more data transformations that may be applied to structured data returned from the selected third-party API endpoint; and/or (3) search through and select one or more formats or display options for rendering or presenting the (optionally, transformed) structured data.

Embodiments described herein resolve these and other problems by providing an abstraction layer, also referred to as a hierarchical path interpreter 122, over CRM API calls. More specifically, the hierarchical path interpreter 122 can be configured to receive, as input, plain text entered by a user/agent into any editable field of any suitable user interface, such as a user interface of a service desk application, and can be configured to provide as output a specifically-formatted API call, along with any suitable authentication and/or authorization tokens, to a CRM system to obtain the requested data without requiring a customer service agent to context switch into the CRM system at all. As discussed previously, these embodiments allow for a customer service agent to search through a CRM for desired or necessary data from within the familiar environment of the agent's service desk application.

For example, when operating a service desk or documentation application (example graphical user interface 103), a customer service agent may receive a call from an unknown caller who quickly identifies him or herself and begins describing an issue the caller is facing. In a conventional system, the agent may be required to load a CRM, represented by graphical user interface 113. The loading of the CRM may require authentication and/or authorization before access is permitted, taking valuable time, which may be exacerbated if multi-factor authentication is required. The user would then need to manually search the CRM to find any relevant information relating to this particular caller/customer and/or associated accounts or software licenses. In many cases, the operations of loading the CRM, accessing content in the CRM, and so on consume valuable time and attention of the agent; the agent may miss critical information while concentrating on using the CRM system.

By contrast, for embodiments described herein, when operating the service desk application, the customer service agent may leverage a hierarchical path language defined by (or implemented by) a hierarchical path interpreter 122, such as described herein, to search the CRM for particular data. For example, the agent may type into an editable field of the service desk application "CRM/SOFTWARE/TENANT/USERS/JOHN" after hearing the caller identify himself as "John." This, in turn, can be received as input to the hierarchical path interpreter 122 which can generate an appropriate API call to the API gateway 132 of the CRM system (external platform services 130) to query all USERS of TENANT of SOFTWARE with a name that includes John. In response, an overlay can be rendered in the graphical user interface 103 of the service desk application to show a list of all persons with a name that includes "John," alongside other relevant information (e.g., account number, license number, SLAs, most recent call, number of recent calls, number of outstanding issues, lifetime number of issues, and so on), thereby providing the agent with immediate helpful context for the call. Once more information is obtained by the agent, the list can be narrowed to a specific user.

In another example, when operating the service desk or documentation application (graphical user interface 103), the customer service agent may leverage a hierarchical path language defined by or implemented by a hierarchical path interpreter, such as described herein, to obtain information about a caller based on the caller's telephone number. For example, the agent may type into an editable field of the service desk application "CRM/TEL/555123456" based on the caller ID shown to the agent. In response, the hierarchical path interpreter 122 can generate an appropriate API call to the API gateway 132 of the CRM system to query all USERS of all TENANTs of all SOFTWARE/PLATFORMS with a telephone number that includes 555123456. In other cases, the agent may type into an editable field of the service desk application "CRM/TEL/3456" based on the trailing portion of the caller ID shown to the agent. In response, the hierarchical path interpreter 122 can generate an appropriate API call to the API gateway 132 of the CRM system to query all USERS of all TENANTs of all SOFTWARE/PLATFORMS with a telephone number that includes 3456. In other cases, the agent may type into an editable field of the service desk application "CRM/SOFTWARE/USERS/TEL/3456" based on hearing from the caller the software name and based on the trailing portion of the caller ID shown to the agent. In response, the hierarchical path interpreter 122 can generate an appropriate API call to the CRM system to query all USERS of all TENANTs of the SOFTWARE with a telephone number that includes 3456.

In these embodiments, the hierarchical path interpreter 122 can operate according to an implementation-specific configuration schema that may vary from embodiment to embodiment. The configuration schema can be used to associate particular path parts to particular API calls or particular sequences of API calls.

In addition, for embodiments described herein, a hierarchical path interpreter 122 may be configured to defined one or more paths or path parts that are specific to a particular organization's (or team's) internal vocabularies, semantics, and taxonomies.

FIGS. 2A-4D depict example graphical user interface elements and a process flow that may be implemented using the system 100 described above with respect to FIG. 1. As discussed previously, the following examples are provided with respect to an example interface with a variety of platforms. In some cases, the content providers are associated with an entity or platform that is distinct from the first-party system or current application being used by the user. However, in other cases, the content provider may be associated with an entity or platform that is common to the first-party system, as is the case when an entity provides a variety of different services that may be accessed through different interfaces or portals. Regardless of the particular provider or degree of separation between the first-party system and the content provider platform, the techniques described herein may still be applicable. Specifically, a link-creation module having a query gateway, as described herein, may be used to provide prompts and selections for the user that may facilitate locating content and creating a selectable graphical object within a current interface or document.

Furthermore, while specific types of platforms and content providers are used for purposes of illustration, the same or a similar approach can be applied to a variety of different types of systems or platforms including, without limitation, cloud-based document management systems (e.g., Google Docs), issue tracking systems (e.g., Jira or Trello), customer-relationship management systems (e.g., Salesforce), project management systems (e.g., Trello, Asana), and other remotely hosted services and platforms.

FIGS. 2A-2F depict an example graphical user interface including a link-creation window that can be used to search third-party content from the context of a first-party collaboration platform. Specifically, FIGS. 2A-2F implement a link-creation module or query gateway in order to receive user input and, based on the user input, formulate valid API calls to a third-party system to allow the user to browse content, and generate a selectable graphical object or link within the first-party collaboration platform without navigating away from a current interface or first-party application.

Figure 2A:
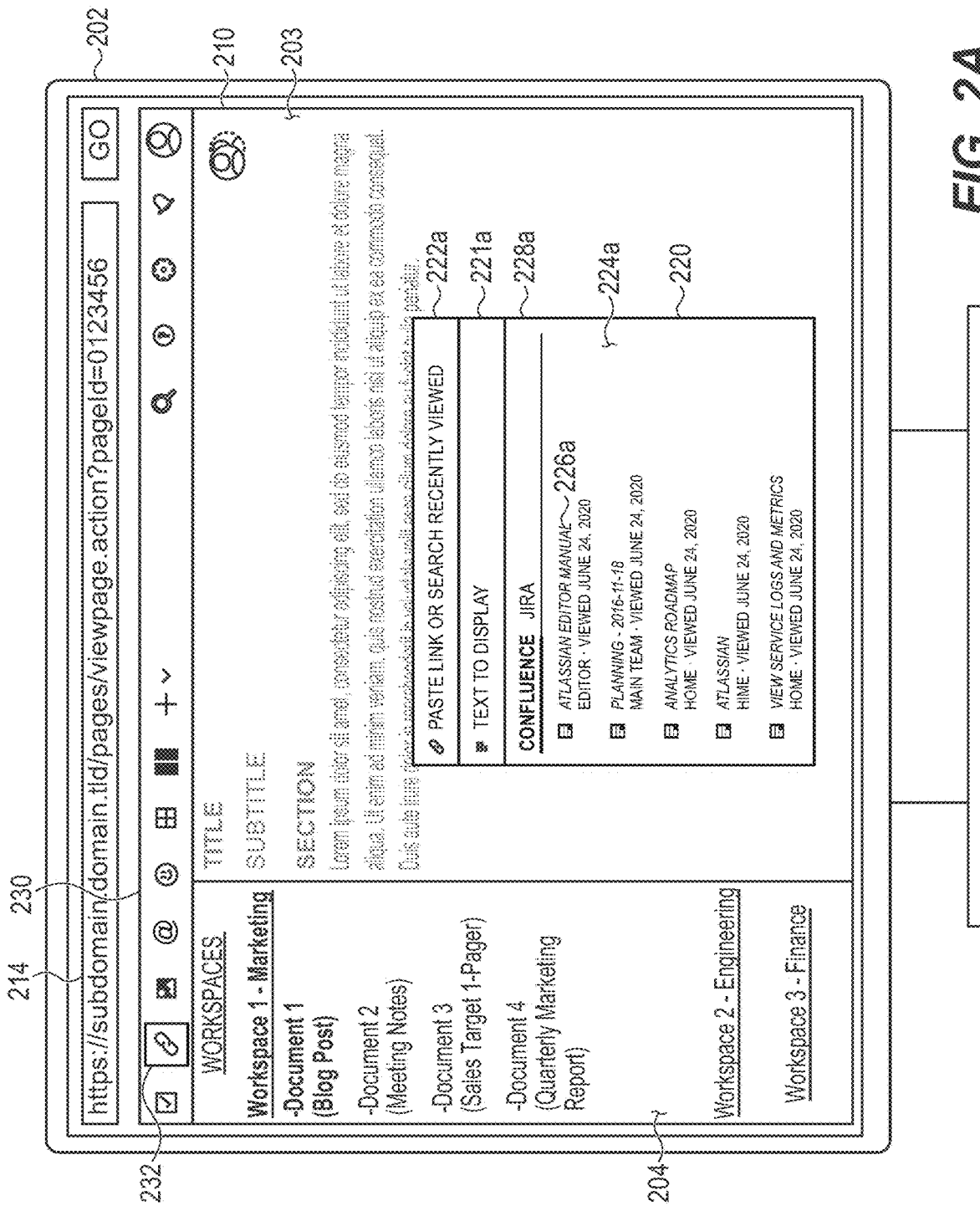
FIG. 2A depicts an example link-creation window in a content-creation field.

As shown in FIG. 2A, the link-creation module or query gateway may be implemented from a graphical user interface 210 provided by a client application operating on a client device 202 or other computing system having a display and user input device. The client application may be instantiated or executed on the client device through either a dedicated client application or a web-based browser or other similar application that is configured to access a portal of a first-party platform via a URL or other addressable network path 214. As shown in FIG. 2A, the graphical user interface 210 includes a content-creation field 203 that is configured to receive user content that may include text, images, videos, links, and other user-generated content. Generally, the content-creation field 203 includes a region that accepts textual input from the user via a keyboard or other similar input device. The graphical user interface 210 may also include other region 204 for navigating between pages, documents, and document groupings or spaces. The graphical user interface 210 also includes a control bar 230, which includes a set of selectable elements that can be used to invoke various software operations or functions.

As shown in FIG. 2A, invocation of the link-creation module may cause the display of a link-creation window 220a that overlays or overlaps some portion of the content-creation field 203. This window 220a may also be called a floating window or popup user interface element. The link-creation window 220a defines a graphical interface that can be used to create a custom selectable graphical object to be displayed in the content-creation field 203. In the example of FIG. 2A, the link-creation window 220a includes a link-creation input field 222a and a set of tabs 228a or similar selection elements that correspond to different content providers that are available and/or registered for use with the link-creation module. The link-creation window 220a also includes a list of elements 224a in a corresponding field for each tab of the set of tabs 228a. The list of elements 224a generally correspond to content items or objects that are available or provided by the corresponding content provider indicated in the respective tab of the set of tabs 228a. The link-creation window 220a also includes a label field 221a that can be used to enter custom descriptive text to be displayed in the selectable graphical object to be created using the link-creation window 220a.

The link-creation window 220a may be displayed in response to one or more inputs that invoke the link-creation module. In this example, the link-creation window 220a is rendered in response to a user selection of a link-creation control 232 located in the toolbar 230 or other region of the graphical user interface 210. The link-creation window 220a may also be rendered or displayed in response to a command line entered into the content-creation field. The command line may include a command character ("/"), which may be used to designate the first portion of the textual input as a link-insertion command. Additional command characters may include, without limitation, "@," "\\," ">," or other characters alone or in combination with additional characters. For purposes of this disclosure, the term "character" may be used to refer to alpha-numeric characters, symbols, glyphs, and other elements that may be provided using a user-input device like a keyboard, touch screen, or other similar device. The command line may also include a main command portion, which can be used to designate the module to be invoked, and one or more command argument portions, which can be used to designate options associated with the module being invoked. For example, the command line may include the text "/linksearch-confluence-jira," which may invoke the link-creation module and the display of the link-creation window. The optional arguments, "confluence" and "jira" may be used to designate that the window should include tabs for content provided by the Confluence and Jira platforms.

In general, the set of content providers is associated with a service provider or other source of content that may be accessible over a computer network. Generally, the content providers may include a multi-tenant software platform that is accessible via a URL or other addressable network location. As described above with respect to FIG. 1, the content providers may have a dedicated interface or portal that provides traditional access to the content items or objects stored on the platform. The current technique may be used to replicate or simulate some of the navigational controls provided by the particular platform but in a way that is normalized or unified through the link-creation module interface. Importantly, the proposed technique may allow the user to navigate content items of the content provider without having to navigate away from the graphical user interface 210. In some implementations, each of the content providers used with the link-creation module is registered with the service. Registration of the content providers may be maintained in a provider registry accessible by or incorporated in the link-creation module. The provider registry may include a list of content providers, link paths, or other addressable network locations, and a set of qualified application programming interface commands or query schema that can be used to access hosted data (e.g., metadata and/or content) stored at the respective content provider. In some cases, the provider registry serves as an abstraction layer by mapping user selections and other input received by the link-creation window into API calls or queries that can be serviced by an appropriate gateway of the content provider. For purposes of the examples described herein, the term API or API call may be used to refer to a broad range of structured calls or queries including traditional REST API commands, Graph QL commands, Sequel Query Language (SQL), Jira Query Language (JQL) or other similar techniques.

As shown in FIG. 2A, the link-creation window 220a includes two tabs 228a, each tab corresponding to a different content provider. Each tab 228a is selectable, resulting in the generation of a different list of elements 224a, which correspond to content items or objects that are available at the respective content provider. In this example, the list of elements correspond to a list of documents or pages that are available at the content provider named on the selected tab. The elements displayed in the respective tab may be cached or pre-stored by the link-creation module in order to improve responsiveness of the user interaction. The elements may be based, for example, on a list of elements that were displayed during a previous session and have been cached for later retrieval. In some instances, the list of elements is generated in response to one or more API calls or queries generated in response to a user selection of the respective tab. For example, in response to a user selection of the respective tab (or in response to invoking the link-creation module), the query gateway may generate an API call to the selected service associated with the content provider. The API call may request a list of documents associated with a default URL address, directory, or class of documents that is stored by the respective service. The API call may be serviced by the API gateway of the content provider, which may return hosted data (e.g., document or page metadata) associated with the items responsive to the query. Based on the hosted data (e.g., metadata), the link-creation module may formulate elements (e.g., item names, description, or other narrative) that are displayed as text in the list of elements 224a. The link-creation module may also generate graphical content including an icon or logo associated with the content provider or associated with the document type, which is displayed with the item narrative in the list of elements 224a. The link-creation module may also include date information indicating the last time the item was viewed or edited, and item status information indicating whether the item is locked or restricted access. In some cases, the displayed element may also include an indicia that indicates whether the element is based on cached data or has been freshly retrieved (via an API call or other query). The indicia may be a font color, highlighting, underlining, symbol, or other visual indica displayed with respect the element. The link-creation module may construct multiple API requests and/or use cached data in order to generate the display of the individual elements in the list. For example, the narrative and document status may be obtained using multiple API calls and the icon or other visual indicia may be based on information cached by the link-creation module.

FIG. 2B depicts another example link-creation window 220b in which a different tab of the list of tabs 228b is selected. As shown in FIG. 2B, the list of elements within the selected tab is initially blank while the link-creation module generates the respective API calls used to retrieve document data and/or metadata from the respective content provider. In some cases, as described above, the link-creation module may cache data, which can be used to generate a list of elements that is displayed when the tab is initially viewed. The list of elements may be refreshed when the API calls have been returned and new elements have been generated. In some cases, the refresh is automatic and, in some cases, the refresh is prompted by a user selection of one of the displayed elements or other selectable item displayed in the link-creation window 220b.

FIG. 2C depicts another link-creation window 220c in which a partial text entry has been input by the user in the link-creation input field 222c. The text entry may be a partial entry in that the analysis and update of the list of displayed elements 224c may be generated before the text entry has been completed by the user. This allows for a dynamic guide for the user, which may allow the user to review the available selections and provide only enough input to retrieve a set or relevant results (as compared to only conducting a search when the text entry is complete or a carriage-return has been received in the link-creation input field 222c).

In the specific example depicted in FIG. 2C, while the textual input has been provided in the link-creation input field 222c, the previous or default elements 224c are still displayed in the respective tab. In response to the partial text entry input to the link-creation input field 222c, the link-creation module (using a query gateway or similar service) may analyze the text entry and generate an API call for the respective content provider. The generation of the API call may include selecting a qualified API from the provider registry based on a textual analysis of the text entry. The qualified API may be further modified by the textual analysis as a portion of the text may be used as an argument or parameter of the API call. The link-creation module (using a query gateway or similar service) may then provide the API call to an API gateway associated with the respective service provider. The details regarding the API gateway may also be stored in or accessible by the provider registry in order to facilitate accurate execution of the API call.

FIG. 2D depicts an example link creation window 220d having an updated list of elements 224d that has been generated in accordance with the results of the API call or query generated by the link-creation module. In this example, the API call returned metadata associated with a set of content items or objects (e.g., documents) that has a document title that partially matches the text input. Specifically, each of the displayed elements corresponds to a document having a title that includes the text "FEF," which matches the partial text entered in the field 222c of FIG. 2C. As shown in FIG. 2D, the user may continue to enter text into the link-creation input field 222d which may be used to generate an additional API call or series of API calls. In some cases, the additional text may be used to sort or select the displayed elements for which metadata has already been retrieved. In some implementations, an API call is generated when the number of displayed elements falls below a threshold, indicating that the previously retrieved (or cached) results have a likelihood of not corresponding to the current text entry in the link-creation input field 222d. In this way, the link-creation module (implementing a query gateway or similar service, may generate a series of API calls to obtain additional hosted data (e.g., metadata) associated with additional content items, which can be used to generate subsequent or updated lists of elements.

Figure 2E:
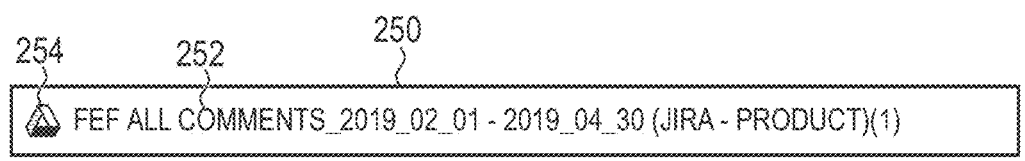
FIGS. 2E and 2F depict example selectable graphical objects.
Figure 2F:
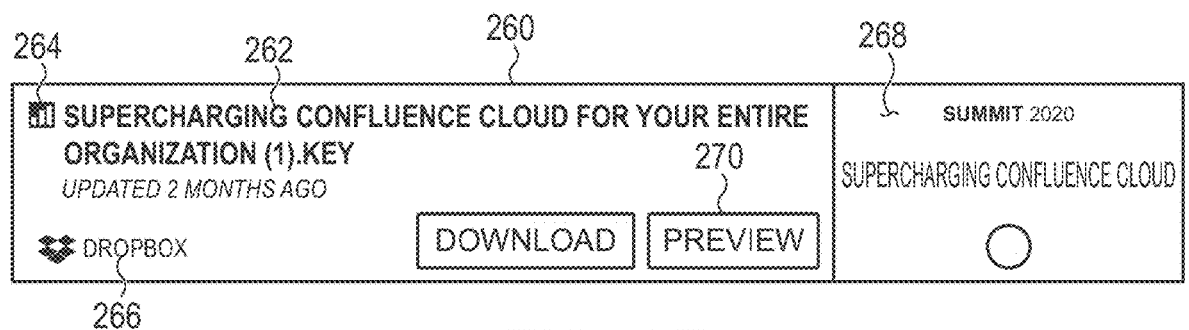

Each of the elements of the list of elements described in any of the previous examples may be selectable by the user, which may be used to generate a selectable graphical object at the respective location in the content-creation field. FIGS. 2E and 2F depict example selectable graphical objects that may be generated in response to a selection of one of the displayed items in the link-creation window. Specifically, FIG. 2E depicts a bar or in-line type of selectable object or link 250 that includes a framed region and descriptive and visual content indicating the target object or source of the content. In this particular example, the selectable graphical object 250 includes a narrative field that may include the title of the linked object or a brief description of the contents. As depicted in FIG. 2A, the link-creation window 220a may include a label field 221a that can receive additional user input that is displayed as a narrative 252 within the selectable graphical object 250. The label field 221a can be used to provide more descriptive text or text that corresponds to content already entered in the content-creation field to provide a more unified and intuitive user experience. As shown in FIG. 2E, the selectable graphical object 250 also includes a graphical element 254, which may indicate a source of the linked object or an application that is associated with the linked document.

One or more of the various elements displayed in the selectable graphical object 250 may be obtained by an additional API call that is formulated in response to a selection of the respective element from within the link-creation window of the previous examples. For example, in response to a user selection, the link-creation module may formulate a targeted API that queries the content provider for additional hosted content (e.g., metadata) associated with the item that corresponds to the selected element. In some cases, the additional hosted content includes more detailed information about the document, page, or other object, which is used to generate the selectable graphical object.

FIG. 2F depicts another example selectable graphical object 260 that may be generated in response to the process outlined above with respect to FIGS. 2A-2D. FIG. 2F also depicts an example of the enhanced or enriched selectable graphical object 260 that may be generated in response to one or more additional API calls. Similar to the previous example, the selectable graphical object 260 includes a narrative 262 and graphical element 264 that may indicate the contents and type of object being linked. Additionally, the selectable graphical object 260 includes an additional graphical element 266 indicating the content provider or platform from which the object may be obtained or is stored and a content item or graphic 268, which may include a preview thumbnail or other image that is generated using content of the linked object. In some cases, the preview thumbnail is stored as part of the metadata associated with the hosted object. In other cases, the preview thumbnail may be generated in response to the API call, depending on the capabilities of the content provider's API set. Also as shown in FIG. 2F, the selectable graphical object 260 includes one or more selectable controls 270, which may be used to interact with the selectable graphical object 260 in a specified way. Here, the selectable controls 270 provide an option to download the object to the client device or preview the object in the display of the client device, without redirecting the user to the content provider or directly to the linked object.

In many of the examples described herein, selection of the selectable graphical object (whether with a mouse selection, touch screen selection, or other user input) may result in the user or the interface of the client device being redirected to a view of the linked object or content. In the case of a remotely hosted document or page, a selection of the selectable graphical object may result in an instantiation or launch of the remote platform or an associated application, which may retrieve and load the linked object for viewing on the display of the client device. In some cases, the linked object is displayed in a separated window and, in other cases, the current window or view of the browser or client device is redirected to the content hosted by the content provider. In this way, access to additional materials or content may be provided within the user-generated content hosted on the first-party service without duplicating storage of the additional content or risking copied content becoming outdated.

FIGS. 3A-3F depict another example sequence for creating a selectable graphical object using the techniques described herein. In particular, the example sequence of FIGS. 3A-3F illustrate an example for the creation of an embedded object in which the selectable graphical object may display interactive content hosted by a remote or distinct platform. Using this technique, the user may view, browse, and even manipulate content that is generated by and stored on a different platform without having to navigate away from a primary graphical user interface or application. Similar to the other examples provided herein, this reduces the need for the user to context switch between applications, while also reducing redundant object storage and helping to maintain the accuracy or freshness of the content, since the content is being provided from a central or single source.

Figure 3A:
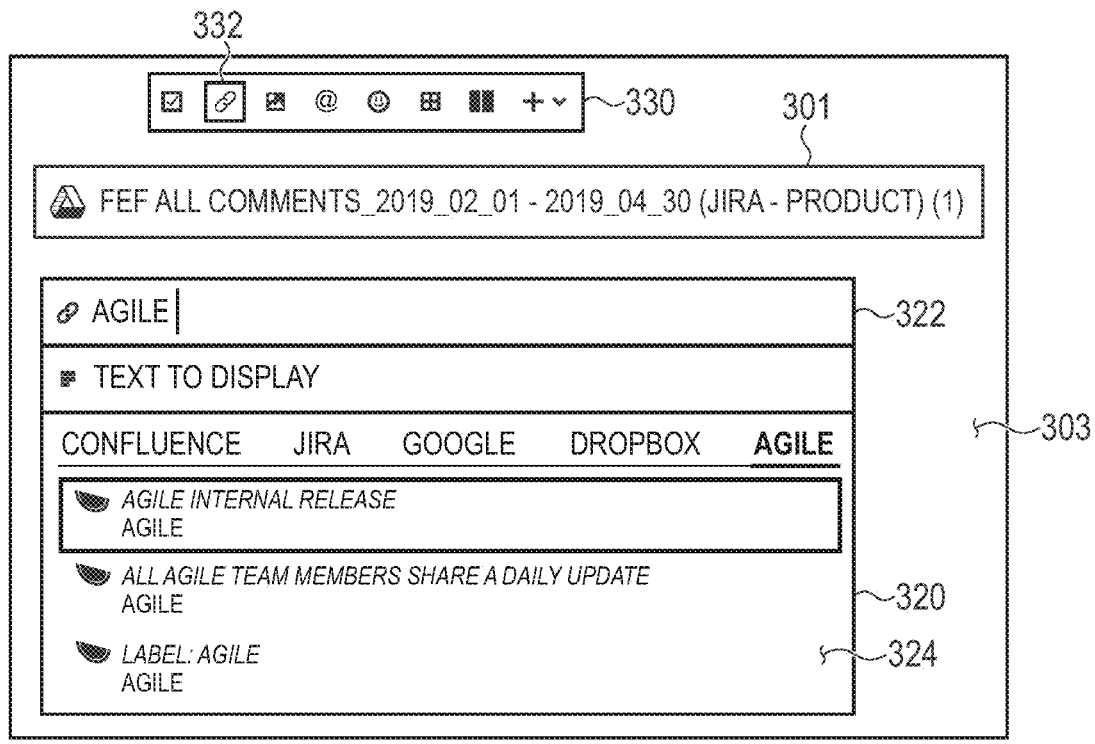
FIG. 3A depicts another example link-creation window in a content-creation field.

FIG. 3A depicts an example graphical user interface having a content-creation field 303 similar to the examples described above. The content-creation field may include previously created user-generated content including other selectable graphical objects 301, as shown in this example. Similar to the examples described above, a user may initiate or instantiate a link-creation module by selecting a link-creation control 332 positioned in a control bar 330 or other similar region of the graphical user interface. In response to a user selection of the link-creation control 332, the link-creation module may render or cause a display of a link-creation window 320 that overlays or overlaps the content-creation field 303. This window 320 may also be called a floating window or popup user interface element.

Figure 3B:
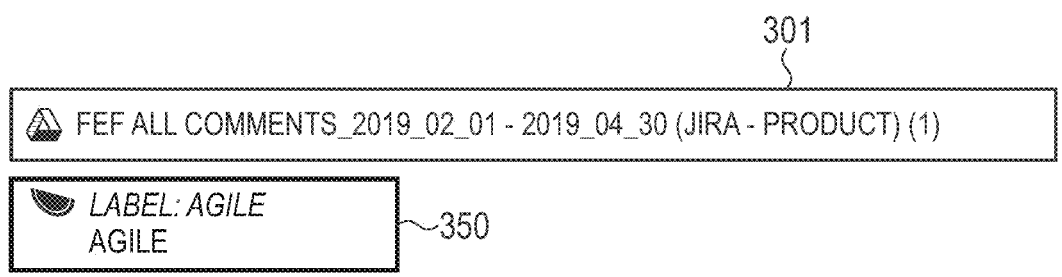
FIG. 3B depicts an example selectable graphical object.

As shown in FIG. 3A, the link-creation window 320 includes a link-creation input field 322, selectable tabs or elements that correspond to various content providers that may be registered via the provider registry, and a list of elements 324 that corresponds to content items or objects stored or provided by the respective content provider. Similar to the previous examples provided herein, the link-creation module (using a query gateway or other similar service) may generate a number of API calls in response to user selections and user textual input in order to obtain host data from a respective content provider. The host data may include document or object metadata and is used to generate a current list of items 324 that allows the user to build a custom selectable graphical object through a series of intuitive prompts provided within the link-creation window 320. FIG. 3B depicts an example selectable graphical object 350 that may be generated in response to the series of interactions with and operations of the link-creation module. A description of these techniques is omitted with respect to this example to reduce redundancy.

Figure 3C:
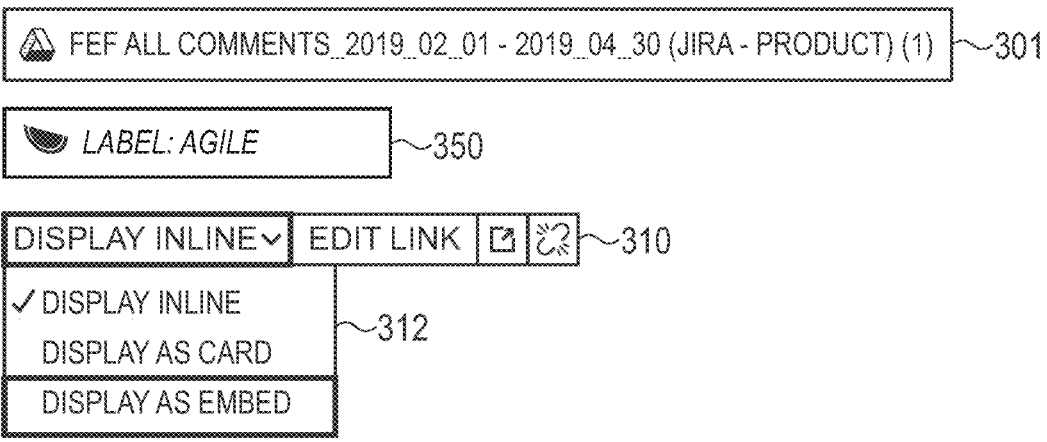
FIG. 3C depicts a link-type selection control.

As shown in FIG. 3C, the selectable graphical object 350 may include a link-control bar 310, which can be used to invoke various options related to the selectable graphical object 350. Specifically, the link-control bar 310 may include a drop-down menu control 312 or other selection control that can be used to change the type of selectable graphical object that is inserted into the content-creation field. In this specific example, the user may use the drop-down menu control 312 in order to change the object type from an inline type to either a card type or an embed type. (Examples of card type objects are provided with respect to other examples described herein.) Here, the user is able to change from the inline type, depicted in FIG. 3C, to an embed type, depicted in FIGS. 3D-3F.

Figure 3D:
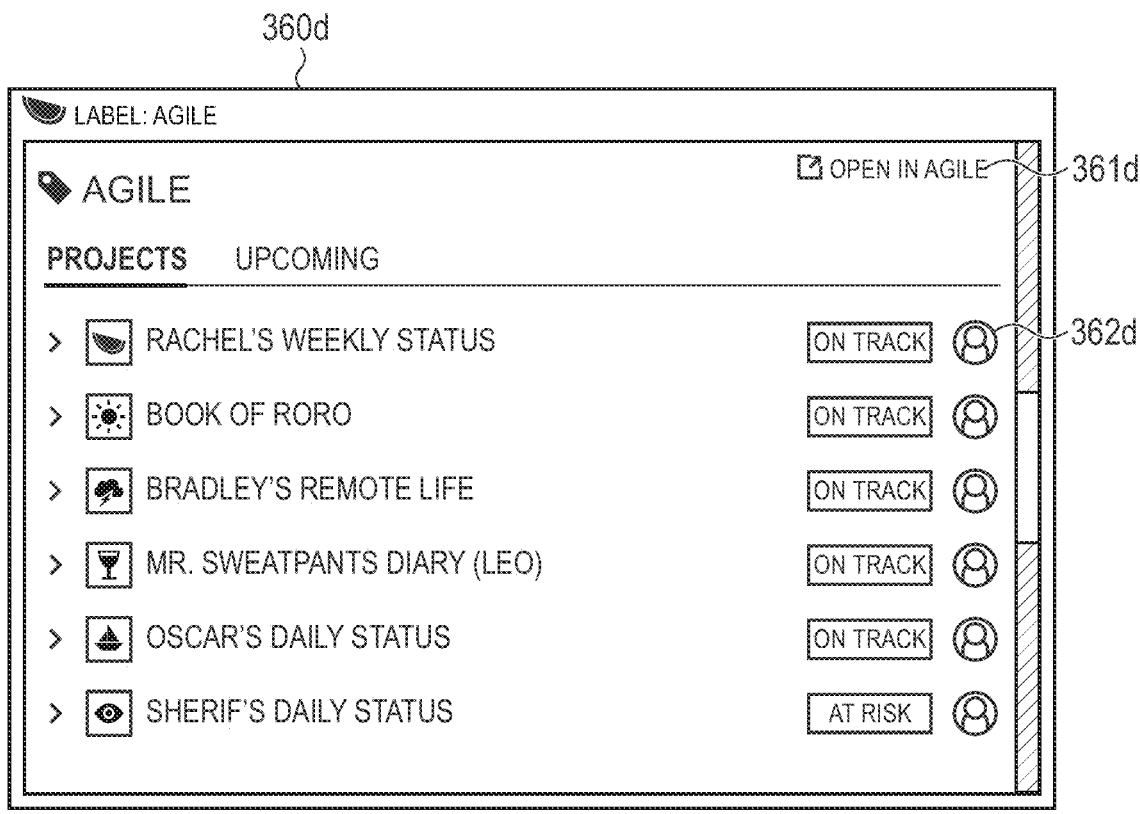
FIG. 3D-3F depict an embedded selectable graphical object having dynamic content responsive to user selections.

FIG. 3D depicts an example selectable graphical object 360d that may be rendered in response to the appropriate user selection in the drop-down menu control 312. In general, a selectable graphical object 360d that is displayed as an embedded object includes live content that is extracted or downloaded from the content provider in response to loading the user interface and, as illustrated in the following examples, updated or modified in response to user interaction with the embedded content. The embedded content may be provided by an HTML-enabled or JavaScript tool like <iframe> or other similar technique for loading web content within a user-interface element of the current document, page, or other user content. Other techniques for creating embedded content may include other web-enabled schema including <embed> and <object> elements. The embedded content may also be enabled by a plugin or other process that is operating in conjunction with the browser or client application. In the event that the client application is a dedicated application and not a web browser, the embedded content may be enabled by a web-enabled user interface module that is integrated with the application.

In the current example, the selectable graphical object 360d includes embedded content 362d associated with a project hosted by the content provider. Rather than displaying a static image, the embedded content 362d includes elements that are extracted from the hosted data and may be selected and interacted with in a similar fashion as may be available in the native environment on the remote platform. Here, the embedded content 362d includes a list of project items that includes a narrative, a status, and one or more graphical elements that indicate a user associated with the item, a source of the project item, or another aspect of the various items. As illustrated in the following examples, a user selection of an element of the embedded content 362*d* may result in an expansion of the content, as shown in FIG. 3E, or redirect the user (within the embedded content) to additional content that is available for a particular selection, as shown in FIG. 3F.

Figure 3E:
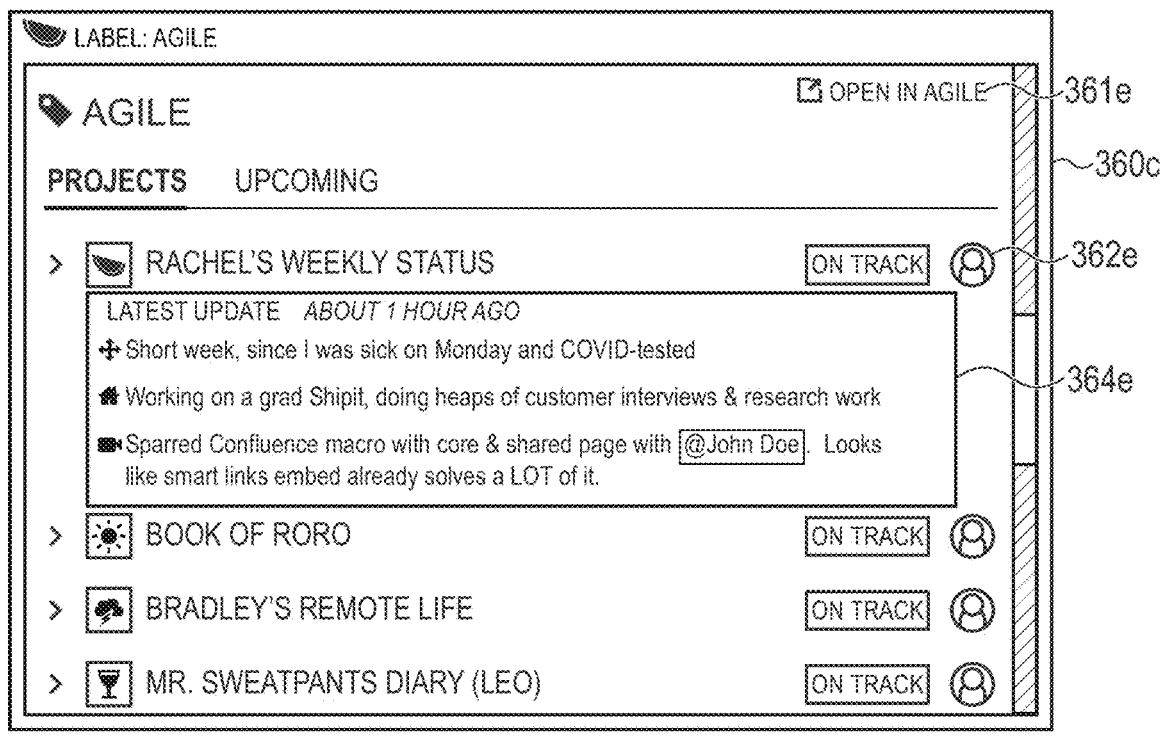

As shown in the selectable graphical object 360*e* of FIG. 3E, a user selection of an embedded element 362*e* may cause the display of expanded content 364*e* within the selectable graphical object 360*e*. Specifically, the user selection results in the selectable graphical object 360*e* generating a request for content associated with a URL or other addressable network location associated with the selectable element 362*e*. In response, the retrieved content is rendered in the selectable graphical object 360*e* in a fashion that may be similar to how the content may be rendered on the native, non-embedded platform. A similar functionality may be available for many of the elements depicted in the embedded content selectable graphical object 360*e* of FIG. 3E.

Figure 3F:
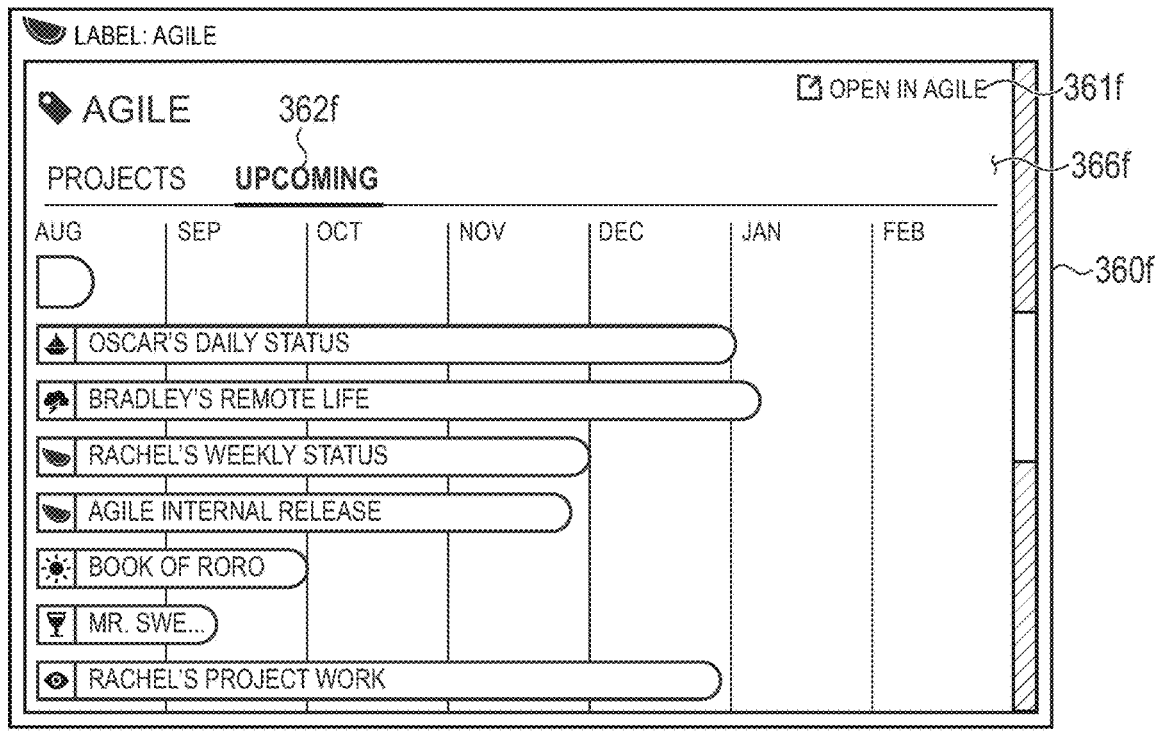

As shown in the selectable graphical object 360*f* of FIG. 3F, a user selection of an embedded element 362*f* may cause the embedded content to be redirected to a different target object. Here, the embedded content is redirected to a different target or content item 366*f*, which is directed to a timeline view of an upcoming project or set of tasks. While the user can interact with elements that are embedded in the selectable object and navigate away from the initial view, the selectable graphical object 360*f* may be returned to a default view or state when loaded for a fresh or refreshed view of the page or document in which the embedded content is inserted. This ensures that each user is able to view the embedded content in a way that the content-creator intended and provides a more uniform user experience. In some cases, if the user has edit control or permissions, a new default view or state of the embedded content may be saved and used for future viewings or page refreshes.

As shown in each of the examples of FIGS. 3D-3F, the selectable graphical objects 360*d*, 360*e*, and 360*f* each include a respective control 361*d*, 361*e*, and 361*f*, respectively, that may be selected in order to redirect the user to the source or target content. The control 361*d*, 361*e*, or 361*f* may function in accordance with the other selectable graphical objects described herein in which the user is redirected to the original content viewed within the native platform or service or in a floating window or popup user interface element.

Figure 4A:
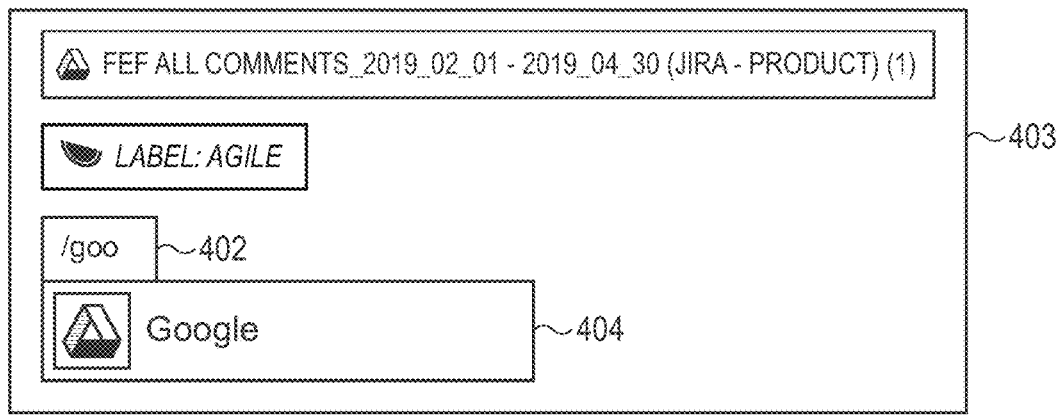
FIG. 4A depicts a command line input in a content-creation field.

FIGS. 4A-4D depict another example sequence for generating a selectable graphical object in accordance with the techniques described herein. As shown in FIG. 4A, a user may invoke the link-insertion module using a command line 402 entered into a content-creation field 403. As described previously, the command line 402 may be designated by a special character "/" and a command portion of the text "goo," which may be interpreted by the system as a command to insert a selectable graphical object in the command line location within the content-creation field 403. The command line may also include various arguments or options, as defined by the link-insertion module or hosted service. As shown in FIG. 4A, the system may generate a graphical prompt 404, which indicates the type of object or the default content provider platform that will be used to seed the link-creation process.

Figure 4B:
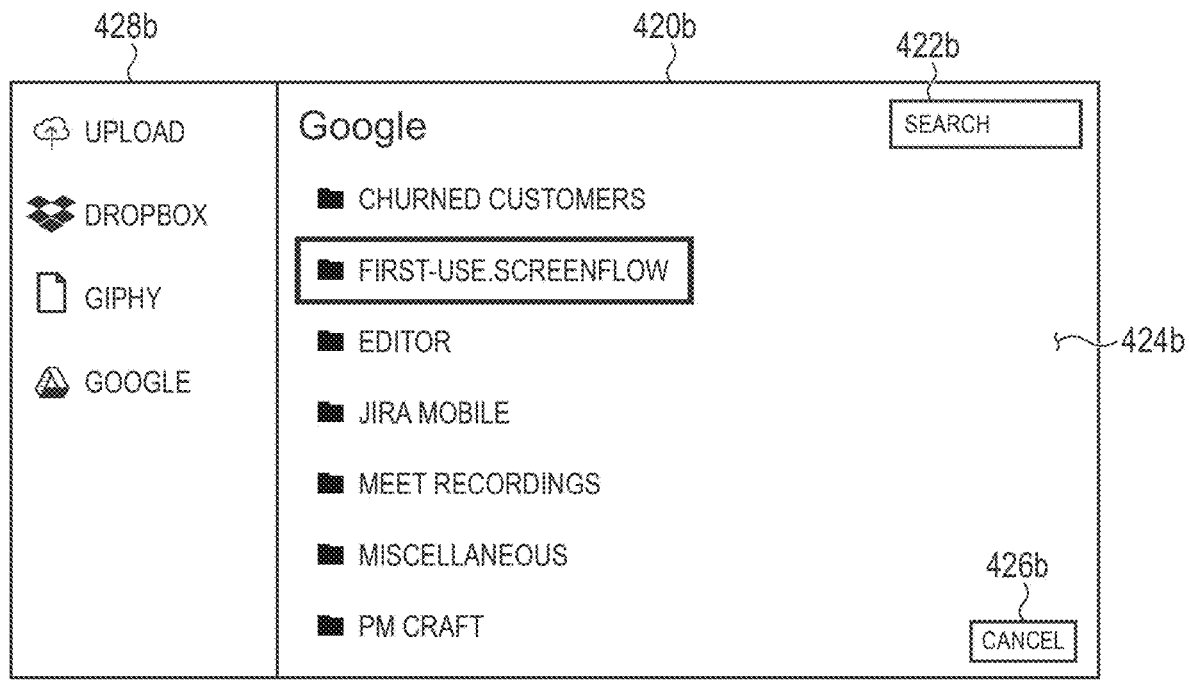
FIGS. 4B and 4C depict an example link-creation window in a content-creation field.

As shown in FIG. 4B, in response to the command line input, the link-creation module may render or cause display of a link-creation window 420*b*, which is overlaid or overlaps the content creation field 403, similar to other examples described herein. As shown in FIG. 4B, the link-creation window 420*b* includes a series of selectable elements 428*b*, which may be used to change the desired content provider or platform. These selectable elements 428*b* may operate in a fashion similar to the selectable tabs described with respect to other examples, herein. In response to a user selection of one of the selectable elements 428*b*, the link-creation module (using a query gateway or other similar service) may generate or identify an API call that is used to obtain hosted content from the respective content provider and generate the list of elements 424*b* depicted in the link-creation window 420*b*. Similar to the other examples described herein, each of the content providers may be registered with the current service, which may be managed by a provider registry or other similar tool. Also similar to previous examples, the link-creation window 420*b* may include a link-creation input field 422*b* or search field, which may be used to generate additional API calls and/or filter and sort content already retrieved from a respective content provider. The link-creation window 420*b* may also include additional controls 426*b* and selectable options.

Figure 4C:
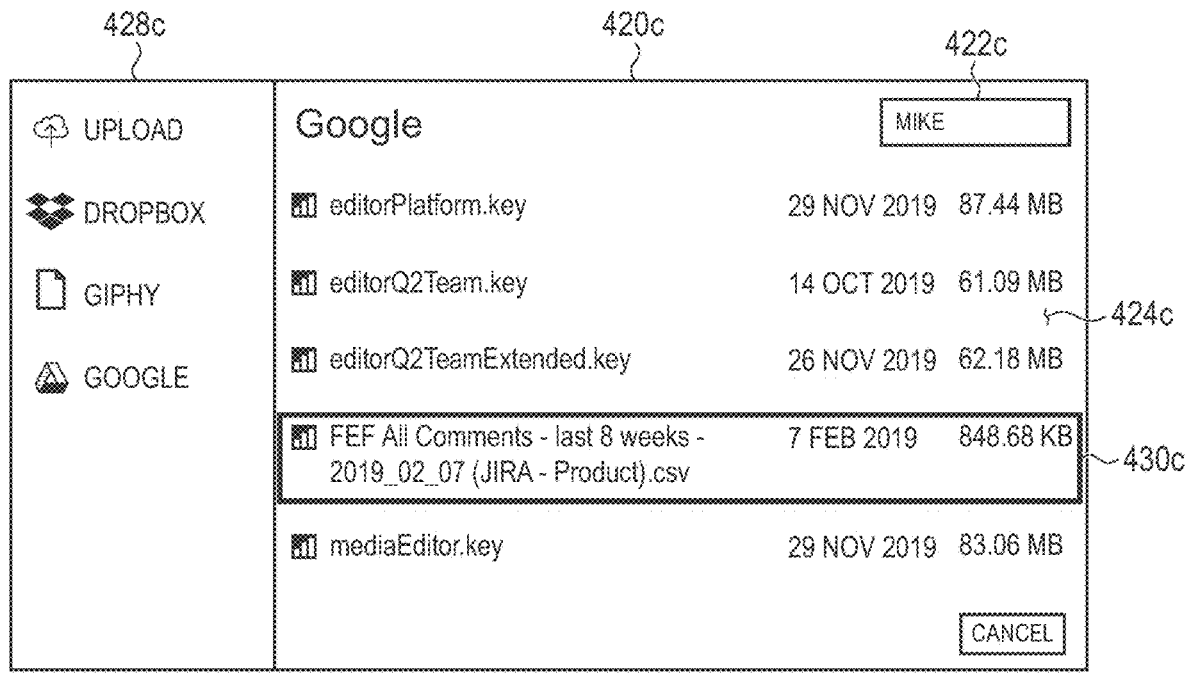

FIG. 4C depicts a link-creation window 420*c* displaying a list of elements 424*c* generated in response to a user selection of the "Google" service provider from the list of selectable elements 428*c* and entered text "mike" into the link-creation input field 422*c*. In response to this user input, the link-creation module generates one or more API calls for the respective platform based on the partial text entry. Here, the link-creation module (using a query gateway or other similar service) generates an API call to the Google cloud-based document API gateway for all documents or objects owned or created by Mike. As discussed previously, the API gateway may only provide results or data for which the current user is authorized to view, as enabled by an authentication scheme or security token. This prevents an unauthorized user from being able to browse private content that may not be otherwise available to the user through the native platform. This also provides an inherent limit to the results that may be returned in response to the API call, which may simplify the link creation process.

In response to the API calls or queries formulated in accordance with the user input, the link-creation module may receive hosted content (e.g., document metadata) that is used to generate the list of elements 424*c* displayed in the example of FIG. 4C. Similar to previous examples, each of the displayed elements 424*c* may be selectable to create the selectable graphical object in the content-creation field at the location of the command line entry. As shown in FIG. 4C, a selected element of the list of elements 424*c* may be visually designated by a visual indicum 430*c*, which may include a highlighted box, bolded text, colored region, shaded region, or some other visually distinct feature indicating the selection of the item.

Figure 4D:
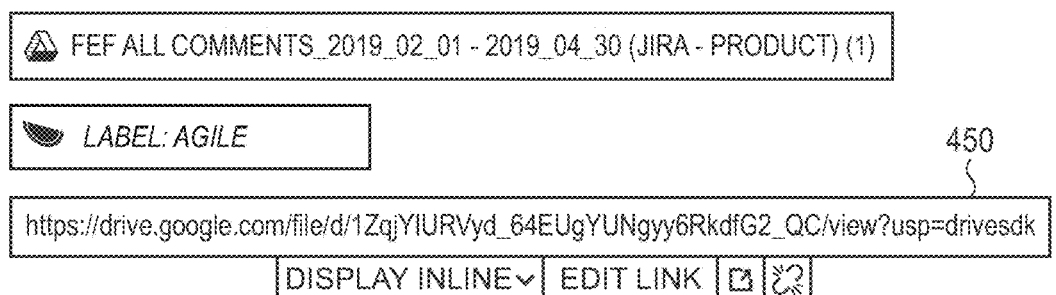
FIG. 4D depicts an example selectable graphical object.

FIG. 4D depicts an example selectable graphical object 450 that may be created as a result of these operations. In this example, the selectable graphical object 450 is an inline-type object. However, any one of the other types of selectable graphical objects may be used, as appropriate for the selected target object. Also similar to the previous examples described herein, the system may display a link-control 410, which may be used to perform various functions with respect to the selectable graphical object 450 including changing the type of object to be displayed.

Figure 4E:
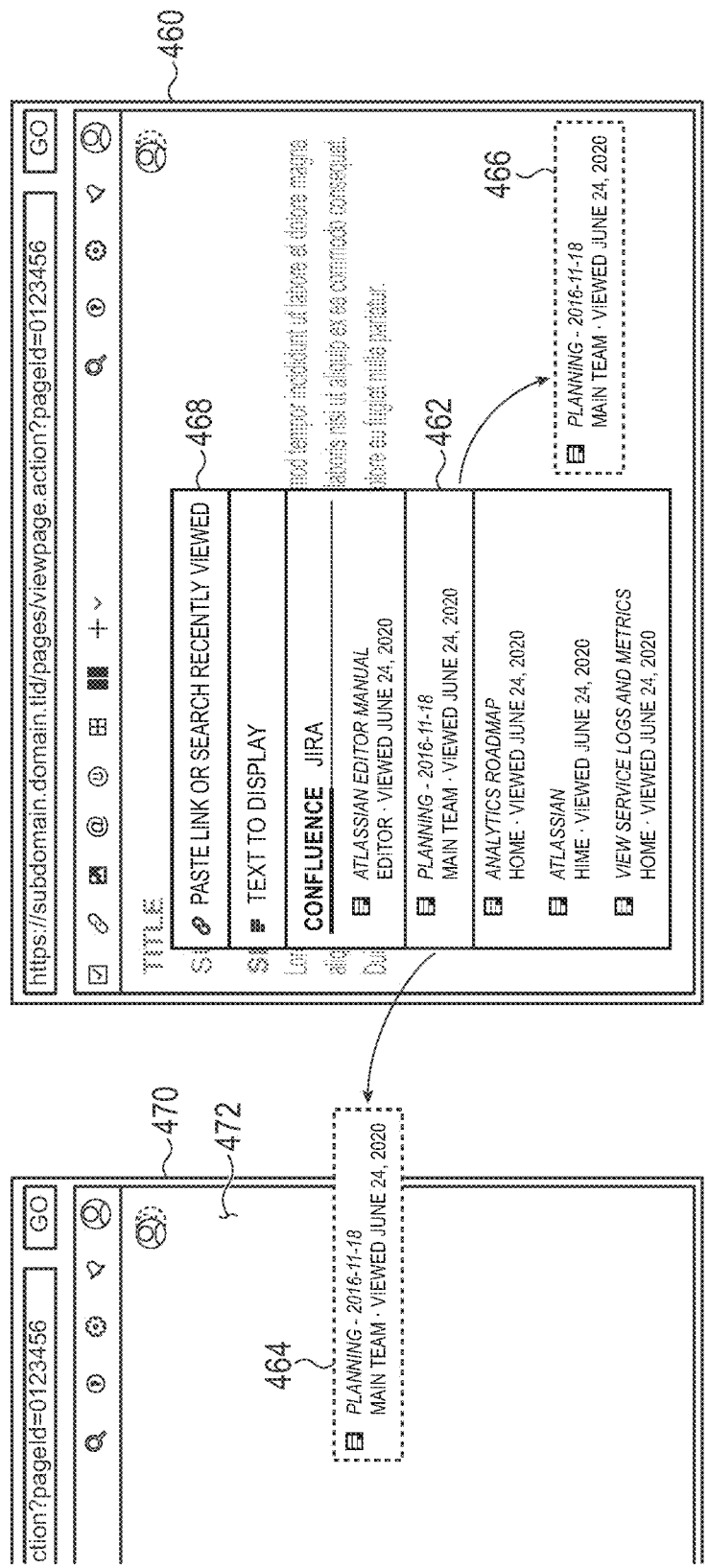
FIG. 4E depicts an example action performed using a selectable graphical object.

FIG. 4E depicts an example action that can be performed using an entry or item displayed in the link-creation interface. Specifically, an item 462 (or multiple items) that are displayed in a link-creation window 468 or other link-creation interface may be selected and dragged from the window 468 directly into the content creation region of a graphical user interface 460. The item 462 may be selected using a mouse, keyboard, touch, or other user input designating the item 462. In response, the item 462 may be highlighted or otherwise rendered to have a visual appearance that is distinct from the other items in the tab of the window 468. Once selected, a mouse, touch, or keyboard input may be used to move or drag the item 462 out of the window and into a region of the graphical user interface 460 resulting in the creation of a selectable graphical object, similar to the examples described herein.

As shown in FIG. 4E, the item 462 may be dragged into a region of the same graphical user interface 460. To assist with placement of the graphical object, a dynamic object 466 may be displayed, which may have a size and shape that corresponds to the selectable graphical object to be created, which may assist the user in placing the object in the content of the graphical user interface 460. In other cases, the dynamic object 466 may have a standard or default size that does not necessarily correspond to the size and shape of the object to be created. The dynamic object 466 may be displayed in a lighter line weight, be partially transparent, or appear as a frame allowing the user to see portions of the content that may be otherwise obscured by the dynamic object 466. In some cases, the dynamic object follows a cursor or mouse control allowing the user to select a location within the content using a mouse, touch, or other similar input.

Additionally or alternatively, the item 462 may be dragged into a field or region 472 in a separate graphical user interface 470. The separate graphical user interface 470 may be a separate page, document, issue, or other object associated with the same or a common platform or service as the one providing the graphical user interface 460. In some cases, the separate graphical user interface 470 may be associated with a separate and distinct platform or service providing the graphical user interface 460. As shown in FIG. 4E, the dragging operation may result in the display of a dynamic object 464, which may have a size and shape that corresponds to the size and shape of the object to be created. The dynamic object 464 may also have a lighter line weight, be partially transparent, or appear as a frame allowing the user to see content "below" or "under" the dynamic object 464. In some cases, the dynamic objects 466 and 464 may be displayed in solid or non-transparent colors.

In this example depicted in FIG. 4E, a single item 462 is dragged from the link-creation window in order to create a single selectable graphical object. However, in another example, multiple items may be selected and dragged from the link-creation window 466 in order to create multiple selectable graphical objects. The selection of the multiple items may occur concurrently (using, for example, a shift-select operation) or may happen as a sequence or non-concurrently. Similar to the placement operations described above, the dragging operation may result in the display of one or more dynamic elements to assist in the placement of the objects within the content.

Another example implementation of the system of FIG. 1 is described below with respect to FIGS. 5A-12. While the following screen shots and examples are provided as an illustration of the principles of this disclosure, the examples are not intended to be limiting in nature and merely serve to demonstrate the use of the proposed systems and techniques. In one example use of the system 100, a customer service agent providing software support to customers may receive a telephone call from an unknown number, from a caller who begins describing a problem the moment the call connects. In order to provide service to the caller, the agent must first identify who the caller is, what software the caller is operating, whether the caller is a VIP, whether the caller should be elevated to a supervisor, what software issue the caller is facing, whether the software issue signals a service level agreement (SLA) compliance problem, and so on. Obtaining, memorializing, and acting on this information (e.g., by searching a CRM) may be particularly challenging while the customer service agent simultaneously devotes attention to listening to the caller.

In this example, as may be appreciated by a person of skill in the art, time is of the essence and the responsiveness with which the agent can address and/or triage the caller's reason for calling directly impacts business reputation, SLA compliance, customer satisfaction, and so on. To address these and other issues, the system 100 of FIG. 1 and other examples described herein may be directed to a simple text-based user interface that can be used from within any editable field of a service desk application: (1) search through, and select, a third-party or first-party CRM API endpoint; (2) search through and select one or more data transformations that may be applied to structured data returned from the selected third-party API endpoint; and/or (3) search through and select one or more formats or display options for rendering or presenting the (optionally, transformed) structured data.

Embodiments described herein resolve these and other problems by providing an abstraction layer, also referred to as a hierarchical path interpreter 122, over CRM API calls. More specifically, the hierarchical path interpreter 122 can be configured to receive, as input, plain text entered by a user/agent into any editable field of any suitable user interface, such as a user interface of a service desk application, and can be configured to provide as output a specifically-formatted API call, along with any suitable authentication and/or authorization tokens, to a CRM system to obtain the requested data without requiring a customer service agent to context switch into the CRM system at all. As discussed previously, these embodiments allow for a customer service agent to search through a CRM for desired or necessary data from within the familiar environment of the agent's service desk application.

For example, when operating a service desk or documentation application (example graphical user interface 103), a customer service agent may receive a call from an unknown caller who quickly identifies him or herself and begins describing an issue the caller is facing. In a conventional system, the agent may be required to load a CRM, represented by graphical user interface 113. The loading of the CRM may require authentication and/or authorization before access is permitted, taking valuable time, which may be exacerbated if multi-factor authentication is required. The user would then need to manually search the CRM to find any relevant information relating to this particular caller/customer and/or associated accounts or software licenses. In many cases, the operations of loading the CRM, accessing content in the CRM, and so on consume valuable time and attention of the agent; the agent may miss critical information while concentrating on using the CRM system.

By contrast, for embodiments described herein, when operating the service desk application, the customer service agent may leverage a hierarchical path language defined by (or implemented by) a hierarchical path interpreter 122, such as described herein, to search the CRM for particular data. For example, the agent may type into an editable field of the service desk application "CRM/SOFTWARE/TENANT/

USERS/JOHN" after hearing the caller identify himself as "John." This, in turn, can be received as input to the hierarchical path interpreter 122 which can generate an appropriate API call to the API gateway 132 of the CRM system (external platform services 130) to query all USERS of TENANT of SOFTWARE with a name that includes John. In response, an overlay can be rendered in the graphical user interface 103 of the service desk application to show a list of all persons with a name that includes "John," alongside other relevant information (e.g., account number, license number, SLAs, most recent call, number of recent calls, number of outstanding issues, lifetime number of issues, and so on), thereby providing the agent with immediate helpful context for the call. Once more information is obtained by the agent, the list can be narrowed to a specific user.

In another example, when operating the service desk or documentation application (graphical user interface 103), the customer service agent may leverage a hierarchical path language defined by or implemented by a hierarchical path interpreter, such as described herein, to obtain information about a caller based on the caller's telephone number. For example, the agent may type into an editable field of the service desk application "CRM/TEL/555123456" based on the caller ID shown to the agent. In response, the hierarchical path interpreter 122 can generate an appropriate API call to the API gateway 132 of the CRM system to query all USERS of all TENANTs of all SOFTWARE/PLATFORMS with a telephone number that includes 555123456. In other cases, the agent may type into an editable field of the service desk application "CRM/TEL/3456" based on the trailing portion of the caller ID shown to the agent. In response, the hierarchical path interpreter 122 can generate an appropriate API call to the API gateway 132 of the CRM system to query all USERS of all TENANTs of all SOFTWARE/PLATFORMS with a telephone number that includes 3456. In other cases, the agent may type into an editable field of the service desk application "CRM/SOFTWARE/USERS/TEL/3456" based on hearing from the caller the software name and based on the trailing portion of the caller ID shown to the agent. In response, the hierarchical path interpreter 122 can generate an appropriate API call to the CRM system to query all USERS of all TENANTs of the SOFTWARE with a telephone number that includes 3456.

In these embodiments, the hierarchical path interpreter 122 can operate according to an implementation-specific configuration schema that may vary from embodiment to embodiment. The configuration schema can be used to associate particular path parts to particular API calls or particular sequences of API calls.

In addition, for embodiments described herein, a hierarchical path interpreter 122 may be configured to defined one or more paths or path parts that are specific to a particular organization's (or team's) internal vocabularies, semantics, and taxonomies.

FIGS. 5A-12 depict example graphical user interface elements and a process flow that may be implemented using the system 100 described above with respect to FIG. 1. As discussed previously, the following examples are provided with respect to an example interface with a CRM system. However, a similar or the same approach can be applied to a variety of other types of systems including cloud-based document management systems (e.g., Google Docs), issue tracking systems (e.g., Jira or Trello), and other remotely hosted services and platforms.

Figure 5A:
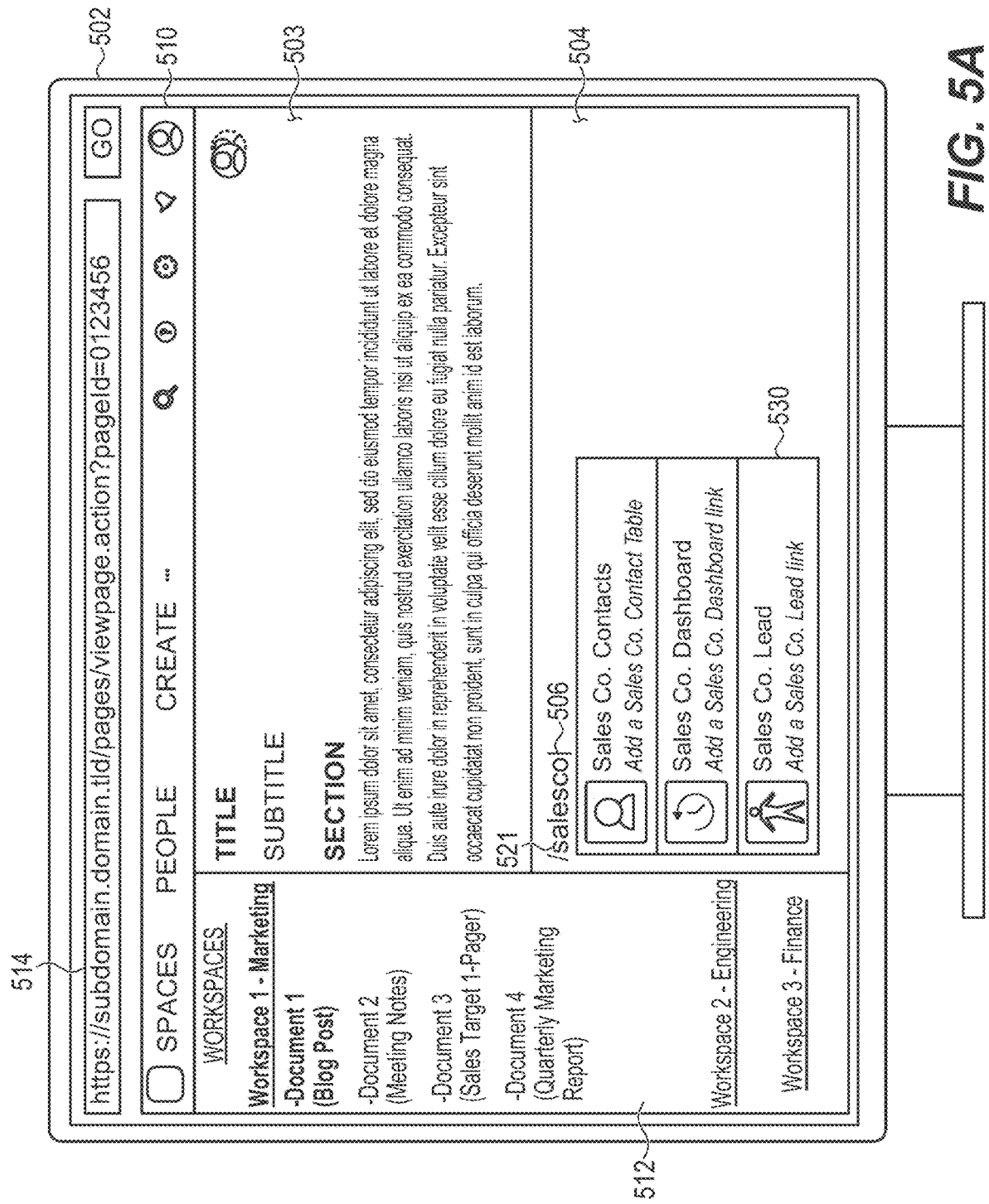
Figure 5B:
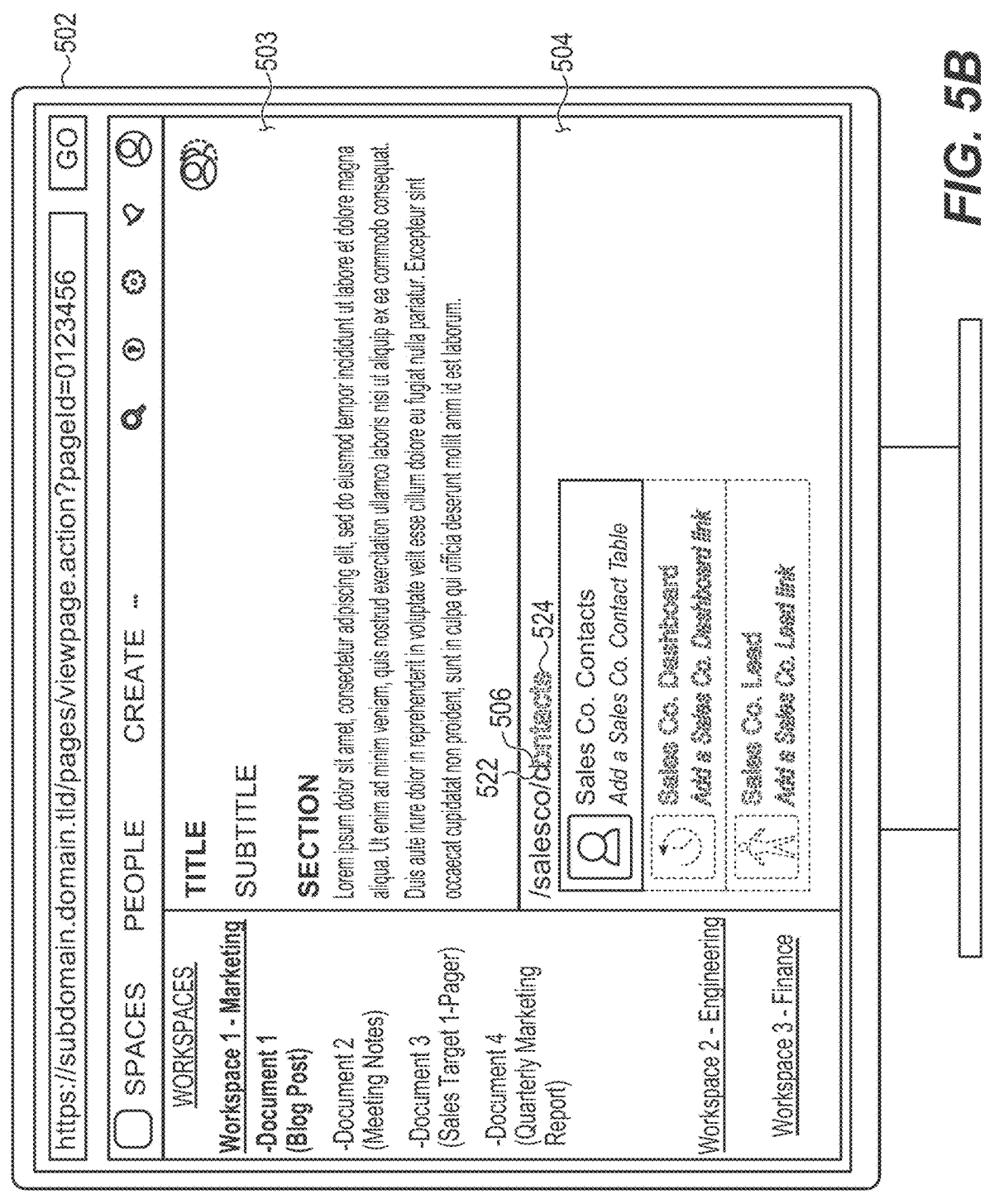

FIGS. 5A-5C depict an example graphical user interface including an editable field in which a link-creation command may be initiated. The graphical user interface 503 of FIGS. 5A-5C may be associated with a documentation or content creation platform. The application of the following techniques and examples is not limited to this specific context and can be applied to a broad range of client application types having editable fields or other regions that are configured to receive text input. In this example, the graphical user interface 503 includes editable field 504. The editable field 504 may also be referred to herein as a content-creation field or user-editable region. Using a keyboard, touch screen, mouse, keypad, or any other user input device of client device 502, the user can enter text, at a cursor position 506 displayed on the graphical user interface 503.

The graphical user interface 503 may include a variety of different fields and graphical objects that can be used to navigate user-generated content or other data provided by the platform. In this example, the graphical user interface 503 includes a title bar 510 that includes a series of selectable options that may provide pull-down or pop-up menus containing a list or set of selectable items that is associated with a particular topic or grouping of functionality. The graphical user interface 503 also includes a navigational region 512, which may be used to navigate to other documents, other document spaces or workspaces, or access other content provided by the platform services. In this example, the client application is a browser and also includes an address field 514, which may display a URL or other path information associated with the content displayed in the graphical user interface 503. The current example depicts a client device 502, which may be a desktop or workstation device. However, a similar or the same graphical user interface 503 may be displayed using a mobile phone, smart phone, tablet, or other computing device having or operably coupled with a display.

As shown in FIG. 5A, the user has entered a first portion 521 of a textual input in the editable content-creation field 504 of the graphical user interface 503. In this example, the first portion of the textual input includes a command character ("/"), which may be used to designate the first portion of the textual input as a link-insertion command. Additional command characters may include, without limitation, "@," "\\," ">," or other characters alone or in combination with additional characters. For purposes of this disclosure, the term "character" may be used to refer to alpha-numeric characters, symbols, glyphs, and other elements that may be provided using a user-input device like a keyboard, touch screen, or other similar device. In some cases, the command character may be inserted using a drop-down or other menu provided by the graphical user interface 503 and is not necessarily "typed" or directly entered by the user.

In FIG. 5A the first portion of the textual input also includes a string or portion of text that designates a target content source or external platform services. Specifically, the first portion of the textual input designates a source "salesco," which may specify a specific CRM or other external platform service. One example CRM may be Salesforce.com, which provides information about sales contacts, marketing analytics, sales pipelines, and other information that may be needed to be referenced by the user. In accordance with the previous examples, the first portion of the textual input may be analyzed by the platform services (e.g., the hierarchical path interpreter 122 of FIG. 1) in order to identify a target content source or external platform service. In some cases, the textual input may correspond to a portion of a URL but it is not necessary that the text correspond as the hierarchical path interpreter may recognize a set of specified commands, which are mapped to a particular URL or API gateway having a similar or different name.

In accordance with some embodiments, a set of API commands or tools is selected in response to analyzing the first portion of the textual input. The API commands may be selected in accordance with API commands supported by an external platform service. The API commands may allow the user to indirectly query, search, extract, or analyze data that is provided by the external platform service, without leaving the context of the graphical user interface 503.

As depicted in FIG. 5A, in response to the entry of the command character, the system may cause a display of a floating window 530 that includes selectable options, each option associated with a different target content source, external platform service, or subtopic or service associated with a content source. The floating window 530 may also be referred to as a floating window object and may overlay or overlap other content or graphical elements of the graphical user interface 503. Through the use of the floating window 530, the graphical user interface 503 may guide the user through a set of options that has been selected in accordance with the portion of the textual input, as the user is typing. This can be used to help the user complete the command by presenting options that are appropriate given the partial input provided. As demonstrated in the series of examples of FIGS. 5A-5C, the list of selectable options displayed in the floating window 530 change as the user enters additional text of the command line.

The target content source or external platform service may host a number of different accounts that are registered with respect to the platform services. As discussed above, access to the platform services and/or the content store may be restricted to users having a registered account and having a set of permissions that allows at least read access to the respective services and data provided by the external platform service. Accordingly, the user may be authenticated before data and/or services are accessible using the hierarchical path interpreter module. In some cases, the use is authenticated in response to the system recognizing or receiving the link insertion command (e.g., entry of the command "/salesco"), as depicted in FIG. 5A. Alternatively, the user may be authenticated before the link insertion command is entered. For example, the client device and/or hosted platform services may be issued a token or other authentication credential created in response to a user authentication protocol that is performed prior to entry of the link insertion command. Authorization protocols may include a multi-factor authentication scheme as defined by the external platform service or in accordance with a single-sign on (SSO) protocol.

FIGS. 5B and 5C depict the graphical user interface as further link or textual input is provided. In the following examples, different portions of the textual input may be characterized as "second," "third," or "additional" portions, which may be used to refer to a specific entry of text in a specific example. One of ordinary skill should recognize that the modifiers "first," "second," and the like are relative in nature and the same portion of text in different examples may be a second, third, or additional portion depending on the context of the particular example being provided and may not be appropriate for all possible implementations. For example, a "second portion" of text in one example may serve as a "third portion" of text in another example.

In FIG. 5B, the user has entered a second portion or additional text 522 after designating "salesco" as the desired external platform service. In this example, the additional text 522 is set off from the base link insertion command by a forward slash. However, in other cases, a different character may be used to set off the additional text or there may be no character separating the first and second portions of the textual input.

In response to the entry of additional text 522 (and while the user continues to enter text or before the entry of text is complete), the system may analyze the additional text 522 and determine additional path information associated with the external platform services. In some cases, the system may use the additional text 522 to construct an API request that is serviced by the API gateway of the external platform services in order to obtain hosted data (e.g., hosted content or additional path link data) associated with the partial path or text entered, so far. Alternatively, the system (using the hierarchical path interpreter) may select from a list of pre-stored or cached options that are associated with a particular external platform service, without having to construct an API call to obtain hosted data. The pre-stored or cached options may be stored using resources of the hosted platform services and/or the client device. The hosted data may include additional link path data or target content data, which may be used to complete the link path of the textual input.

As demonstrated by this example, the analysis of the link path may be dynamic in nature so as to provide useful information to the user, as the user continues to enter or has recently finished entering the link path. Analysis of a partial or full link path may be triggered in response to one or more criterion triggered by an amount of text entered, an amount of elapsed time, or other relevant event. For example, an analysis of the link path and generation of an API request may be triggered in response to a threshold number of characters being entered. The analysis and API request may also be performed in response to both a threshold amount of text being entered and a timing criterion being satisfied. For example, the threshold represents a minimum amount of new text that must be entered before a new API request is generated. In addition, the timing criterion may specify a minimum time to elapse between API requests to avoid the generation of too many API requests being generated too quickly, which may cause performance issues for the external platform service. In some cases, the timing criterion is dynamically adjusted in response to a measure of latency between API requests being sent and results being provided by the external platform service.

Because the user may be granted a set of permissions with respect to only a portion of the data and/or services provided by the external platform services, responses to API requests or additional path information may be determined in accordance with the set of permissions provided for the particular user. For example, the user may need to be granted at least "read" or "view" permissions for data and services that are displayed or suggested to the user through the described technique. In some cases, the user may view options that are associated with restricted data or restricted services but cannot select or access the underlying data without having an appropriate set of permissions allowing at least "view" or "read" permissions.

As shown in FIG. 5B, the selectable options displayed in the floating window 530 have changed in accordance with the entry of the additional text 522. Specifically, the entry of the additional letter "c" may be interpreted as an indication that the link will be related to "contacts" associated with a particular service offered by the external platform service "Salesco." As shown in FIG. 5B, while only the relevant selection associated with contacts is selectable, the additional, previously selectable options may continue to be displayed, indicating to the user that available options may be available if entry of the additional text 522 is deleted or revised. This helps guide the user through the creation of the path text without having to change context or even remove hands from the keyboard or other input device in order to navigate potential options.

As also shown in FIG. 5B, in line with the text but to the right of the cursor 506, the system may cause the display of additional path information or a predicted completion text portion 524 that is predicted to be relevant to the additional text 522. The predicted completion text portion 524 may be determined based on additional link path data (example hosted data) obtained from the external platform services. Here, the remainder of the word "contacts" (specifically, the text "ontacts") is displayed in a font having a different color (e.g., reduced darkness) or line weight, indicating the predicted completion of the text being entered by the user. In some cases, the predicted completion text portion 524 may be highlighted, displayed in a different color value or hue, or otherwise be displayed with a visually distinct format with respect to the portion or portions of text entered by the user (to the left of the cursor 506). The additional text or predicted completion text portion 524 that is displayed to the right of the cursor 506 may dynamically change in accordance with further characters or text entered by the user. In some cases, the predicted completion text portion 524 may be selected by the user using a mouse, touch screen, or other similar input. In some cases, the predicted completion text portion 524 may be selected by the user using the tab key, space bar, a directional arrow key, or other designated key of the keyboard or input device.

FIG. 5C depicts the textual input after the user has entered a third portion or additional text 526. In response to the entry of the additional text 526, the system using, for example, a hierarchical path interpreter module, may analyze the additional text 526 and determine or construct an API call or request to the target content source or external platform service, which may be serviced by a respective API gateway. In response to the API call, the system may receive hosted data that corresponds to data accessible at a location that corresponds to the path or partial path information entered by the user. In this example, the additional text 526 is a first name "John" and the system may formulate an API call to query the Salesco platform for contacts having the first name John. In response, the system may receive, from the external platform service, hosted data that includes search results for the query performed as a result of the API call. Because the hosted data is directed to one or more items or contacts (rather than additional link path data), the hosted data may be classified or referred to as target content data. All or some of the hosted data may be displayed to the user before the entry of the textual input is complete. For example, if a majority or a representative amount of hosted data corresponds to the name "John Smith" the last name "smith" may be displayed in-line with the entered text. In accordance with the previous example, the predicted completion text 528 may be displayed in a ghosted, lighter, or otherwise visually distinct font to the right of the cursor 506, thereby suggesting to the user a predicted completion of the text entry.

In response to determining that the textual input includes a last path component, the system may complete the link path and create a selectable graphical object or selectable link. In the example of FIG. 5C, a floating window 532 is displayed that provides one or more selectable options for displaying the data retrieved from the external platform service. Specifically, the user may select a first option 534 corresponding to a display of a contact table and a second option 536 corresponding to a display of a contact card. In some cases, the display or formatting options are displayed in response to an additional selection of the floating window 532 or other element of the graphical user interface 503. In accordance with some embodiments, the formatting options may also be designated by the user through the entry of a format or display command designated by a special symbol (e.g., a period "." semicolon ";" colon ":" or other type of symbol).

Figure 6:
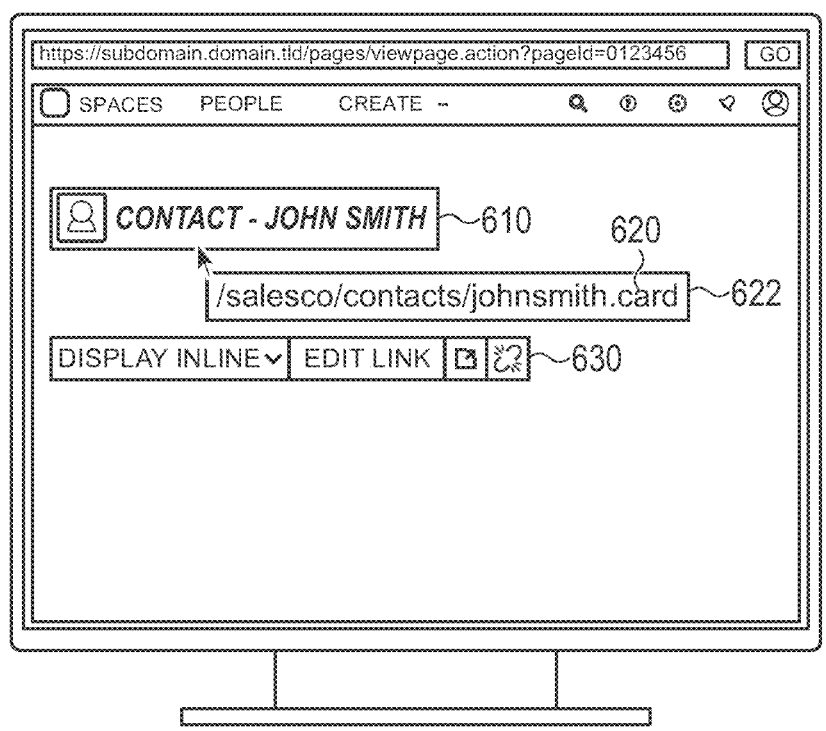
FIG. 6 depicts an example selectable graphical object.

FIG. 6 depicts an example selectable graphical object, specifically a contact card. As a result of the sequence of operations described above with respect to FIGS. 5A-5C, the system may generate a contact card 610, which is displayed as a tile or region that is selectable by the user by a mouse, touch, or other similar user-interface input command. The tile or region of the contact card 610 (also referred to herein as a card graphical object or card tile) replaces the link path used to generate the selectable graphical object. The tile or region of the contact card 610 includes a portion of the hosted data retrieved from the external platform services which, in this case, includes the contact's name "John Smith" and a thumbnail image associated with the contact. The thumbnail image may include a photographic image of the person associated with the contact or may include a representative headshot designating the contact as being associated with a single person (as opposed to a group of people or team). In some cases, the contact card 610 may also include a logo or graphic that is associated with the external platform service (e.g., "Sales Co") or otherwise indicate the source of the data.

In response to the contact card 610 being selected, the user may be redirected to a graphical user interface provided by the external platform service and directed to a page or record associated with the displayed contact. In this example, the user may be redirected to a document or record that includes further hosted data provided by Sales Co's content store. Redirection may cause the user to leave the computing environment provided by the hosted platform services so that navigation can continue using the external platform services' (Sales Co's) computing environment and resources. Alternatively, in response to the card 610 being selected, instead of being redirected, a separate floating window or user-interface portal may be generated and the additional hosted data related to the contact may be displayed in the floating window or portal.

The action performed in response to selection of the contact card 610 may depend on the authentication status of the user operating the graphical user interface. For example, the contact card 610 may be created by a first user having been authenticated and having been granted a broad set of permissions with respect to the hosted data associated with the contact card 610. Subsequent to creation of the contact card 610, a second, different user may view the content including the contact card 610 and the second user may have a different authentication status or set of permissions with respect to the hosted content being provided by the external platform services. If the second user is not authenticated and/or does not have a set of permissions allowing "read" or "view" access to the hosted data, the selection of the contact card may not redirect the second user to a separate graphical user interface having the additional contact information or may not otherwise be provided with access to the hosted data (until an authentication is complete and appropriate permissions are established). In some cases, the second user may be redirected to a portal of the external platform services that displays a message regarding the authentication status of the user, explaining that access is denied, or other information other than the hosted contact associated with the path associated with the contact card 610. In some instances, the portal of the external platform services may provide a series of prompts or editable fields that allow the second user to enter login credentials and establish an authentication protocol.

As shown in FIG. 6, the contact card may be associated with the complete path or command line 620 depicted, for purposes of illustration, in floating window 622. In this example, the complete path 620 includes a first portion designating the link insertion command (e.g., "/salesco"), a second portion indicating a path or portion of a path (e.g., "contacts/johnsmith") and a third portion including a format designation (e.g., ".card"). In this example, the format designation is set off by a special character, here a period ".". However, in other implementations, the format designation may be set off by a different character (e.g., another forward slash "/") or a group of characters (e.g., "\\"). In even other implementations, the format designation is not set off from the remainder of the path by any character. The floating window 622 depicting the complete path 620 may be displayed in response to a mouse-over or hover user input action (e.g., a selection cursor arrow is positioned over the tile region of the contact card 610 and not moved for more than a threshold or predetermined amount of time or dwell). In other cases, the complete path 620 may not be displayed to the user through the graphical user interface once the selectable graphical object is created.

As also shown in FIG. 6, in response to the creation of the selectable graphical object (contact card 610), an object toolbar 630 may be displayed in a region adjacent to the selectable graphical object. The object toolbar 630 may only be displayed in response to a particular user input (e.g., a mouse-over or hover input) or entry of a special command (right-button mouse selection). In some cases, the displayed content must be in an edit mode or otherwise be editable by the user in order to display the object toolbar 630. The user may also need to have an appropriate set of permissions with respect to the hosted content platform in order to view or engage with the object toolbar 630 (which may be different than the set of permissions associated with the hosted content of the external platform services, discussed above).

Figure 9:
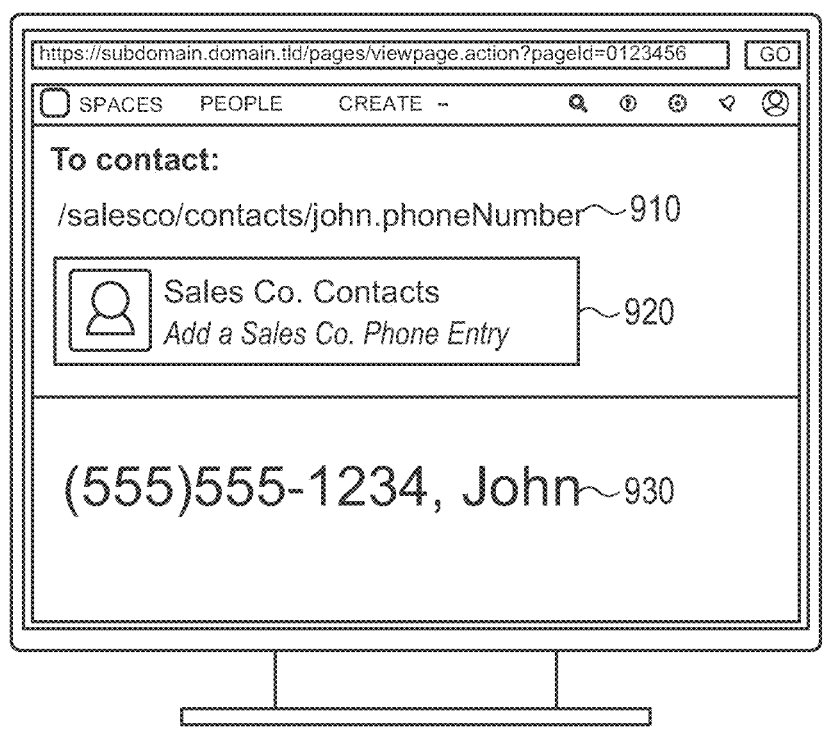
FIG. 9 depicts another example selectable graphical object.

The object toolbar 630 may include multiple selectable options including, without limitation, a first selectable option for changing the format designation of the contact card 610. For example, the first selectable option may allow the user to change from a contact card or inline format to a table format, an embedded format, phone number format, or other format designation for the selectable graphical object (contact card 610). Other format designation results are depicted in FIGS. 7 and 9, discussed below. A second selectable option may allow the user to view and edit the complete link path 620. Selection of the second selectable option may invoke or cause a display of an editable field displaying the complete link path 620, which may be modified by the user by keyboard, mouse, touchscreen or other input device. The object toolbar may include additional selectable options for copying or sharing the contact card 610 or linking the contact card 610 with other operations or data objects provided by the host platform services.

FIG. 7 depicts another example selectable graphical object, specifically, a table of contacts. As a result of the sequence of operations described above with respect to FIGS. 5A-5C, the system may generate a link table 710, which is displayed as a table of entries that are selectable by the user by a mouse, touch, or other similar user-interface input command. The link table 710 replaces the link path used to generate the selectable graphical object. The link table 710 includes a portion of the hosted data retrieved from the external platform services which, in this case, includes specific data associated with a group or set of contacts. Specifically, names, phone numbers, titles, addresses, and other information associated with each contact is displayed within each cell of the link table 710. In this example, the link table 710 may contain static data that represents the state of the data at the time it was retrieved and is not updated in accordance with changes to the hosted data made on the external platform service (after the link has been created). In other examples, like the embedded table example of FIG. 12, the contents of the table may be dynamically modified to reflect changes to the hosted data made on the external platform service.

Selection of elements contained in each of the cells of the link table 710 may result in a redirection or display of different hosted data provided by the external platform services. For example, selection of text within the email cells 712 of the link table may redirect the user to an email client or other messaging interface for composing a message to the respective contact. In some cases, selection of text within the email cells 712 redirects the user to a messaging service provided by the external platform service, which may present a communication interface for composing a message to the respective contact. Similarly, selection of text within the phone number cell 714 may initiate a phone call or redirect the user to a telephony interface for placing a call. Selection of other text associated with other cells 716 may result in a redirection to a service or content provided by the external platform services, similar to as described above with respect to the contact card 610 of FIG. 6.

Similar to the previous examples, display of content within the cells of the table and/or actions that may be performed in response to selections of different portions of the link table 710 may depend on the authentication status and/or set of permissions granted to the particular user viewing the link table 710. In some instances, depending on the set of permissions associated with the user, some portions of the link table 710 may display the hosted content, for hosted content that is permissible to view, and other portions of the link table 710 may be hidden from the user or have placeholder graphics inserted into respective cells indicating that access to the data is not available.

Also similar to the previous examples, a complete link path 720 may be displayed in a floating window 722 or other similar graphical element. The link table 710 may be associated, in some cases, with a single link path 720, which may be used to refer to a location or set of results provided by the external platform services. In other cases, the link table 710 may be associated with multiple link paths, each link path associated with a different location or result provided by the external platform services. For example, each row or group may be associated with a distinct link path. While not displayed explicitly in the current state of the link table 710, an object toolbar similar to the object toolbar 630 of FIG. 6 may also be displayed in a region adjacent to the link table 710 and allow for the selection of different format designations, allow for the link path to be edited, and provide other functionality associated with the link table 710 consistent with the previous description. When changing from a link table format to a card or other single-entity format, the link table 710 may be replaced with multiple single-entity format objects, each object corresponding to a row of the link table 710.

FIGS. 6 and 7 depict alternative selectable graphical objects that may be generated using the hierarchical path interpreter module or path interpreter module. In some implementations, the path interpreter module analyzes hosted data retrieved from the external platform service and automatically determines a format for the selectable graphical object. In particular, the path interpreter module may analyze the received data and, in accordance with a determination that the received (hosted) data corresponds to a single contact, entity, or item, the path interpreter module may cause the creation and display of a card or single-entity selectable graphical object similar to the example depicted in FIG. 6. In accordance with a determination that the received (hosted) data corresponds to multiple contacts, entities, or items, the path interpreter module may cause the creation and display of a link table similar to the example depicted in FIG. 7. In some cases, the received (hosted) data is analyzed to determine a type of data that is received, which may be used to determine the format of the selectable graphical object to be inserted. For example, in accordance with a determination that the data includes an image or graphical object type of data, the path interpreter module may automatically determine that the format will correspond to an embedded object format, similar to the example depicted in FIGS. 10A and 10B. Similarly, in accordance with a determination that the data corresponds to a phone number or other electronically addressable contact information, the path interpreter module may automatically create a selectable phone number object, similar to the example depicted in FIG. 9.

The format of the object may be determined by a format designation portion of the link path. As described previously, the system may append the link path with a format designation set off from the rest of the path with a special character like a period "." or a slash "/". In some cases, the system prompts the user for the type of object to be created (e.g., shown in the floating window 532 of FIG. 5C). Alternatively, the system automatically determines the format of the object and creates the object without additional input from the user. As explained above with respect to previous examples, the user may change the default or automatic format selection using, for example, the object toolbar interface or other selectable option.

Figure 8:
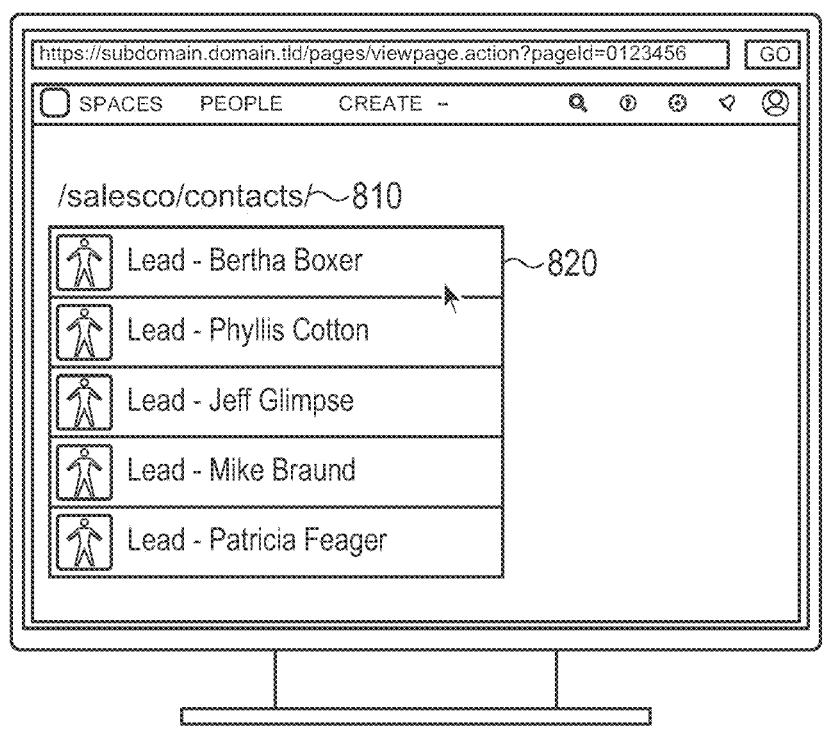
FIG. 8 depicts an example floating window with multiple selectable options corresponding to data hosted by an external platform service.

FIG. 8 depicts an alternative floating window or floating window object that includes multiple options obtained via the API call or request. In accordance with the creation of a link-insertion command similar to the example provided above with respect to FIGS. 5A-5C, a path interpreter module may return multiple results as a result of an API call or request. Specifically, the path interpreter module may formulate an API call to the target content source or external platform service (e.g., Salesco) based on a portion of the link path 810 (e.g., "contacts"). In response to the API call or request, the target content source may query an appropriate content store and provide a set of results or items that corresponds to the API request. The set of results may be determined based on the set of permissions granted to the user associated with the client device operating the graphical user interface.

As depicted in FIG. 8, at least a portion of the set of results is displayed in the floating window 820. Each item displayed in the floating window 820 may be selectable by the user. In response to a selection of a respective option, the system may modify the link path 810 to reflect the selection made by the user by including a portion of the received (hosted) data. By way of example, a selection of the item labeled "Lead-Bertha Boxer" may result in the link path 810 being edited by the system to include the additional path text "berthaboxer" or "boxer." As an additional example, selection of one of the items displayed in the floating window 820 may result in a modification of the link path to include a predicted next level in the data hierarchy, which may be contacts designated as "leads" or contacts associated with a particular project. In response to the selection and resulting modification of the link path 810, the link path interpreter may formulate an additional API call or request to the target content source. The results of the additional call or request may be used to present additional items or propose additional predicted completion text for the link path 810. Alternatively, the link path interpreter may filter pre-fetched data to display items or propose additional predicted completion text that correspond to the modified link path (resulting from an earlier selection of an item in the floating window 820).

FIG. 9 depicts another example selectable graphical object that may be created using the techniques described herein. Specifically, as a result of the sequence of operations described above with respect to FIGS. 5A-5C, the system may generate a selectable link 930 using the link path 910. In the example of FIG. 9, the selectable graphical object is a single-line contact item 930, which, in this case, includes a phone number and contact name. The single-line contact item 930 replaces the link path 910 used to generate the selectable graphical object. In the illustration of FIG. 9, the lower portion of the figure represents the graphical user interface after the creation of the single-line contact item 930, which replaces the link path 910 displayed in the upper portion of the figure. The phone number and contact name may be a portion of the received (hosted) data obtained using the above-described techniques. The single-line contact item 930 may be created and displayed automatically in accordance with a determination that the hosted data corresponds to a particular type or classification, as discussed previously. The single-line contact item 930 may also be generated in response to a selection of an option displayed in the link creation object 920.

In the example of FIG. 9, the link path 910 includes a format designation ".phoneNumber" indicating that the format of the selectable graphical object should be displayed in accordance with the single-line contact item 930 including a display of the phone number. The single-line contact item 930 is selectable and may redirect the user to a telephony application for placing a telephone call or redirect the user to content hosted by the external platform service, which is associated with the displayed content item 930. Other actions, operations, and functionality discussed with respect to previous examples, including the use of an object toolbar, user permissions for access, and actions performed in response to selection of the selectable graphical object, may also apply to the example of FIG. 9, an explicit discussion of which is omitted to reduce redundancy.

Figure 10A:
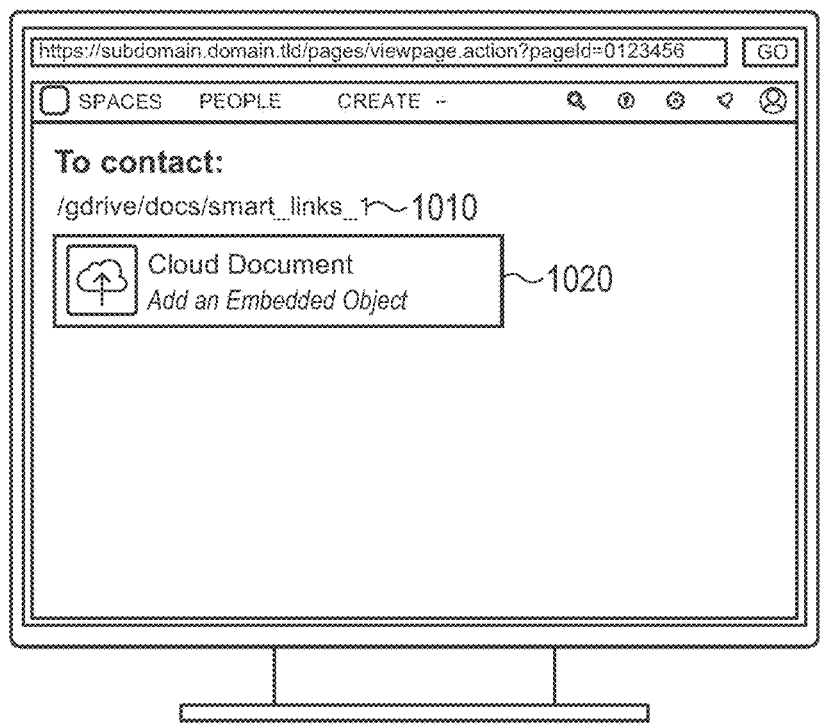
FIGS. 10A-10B depict another example selectable graphical object having embedded content hosted by an external platform service.
Figure 10B:
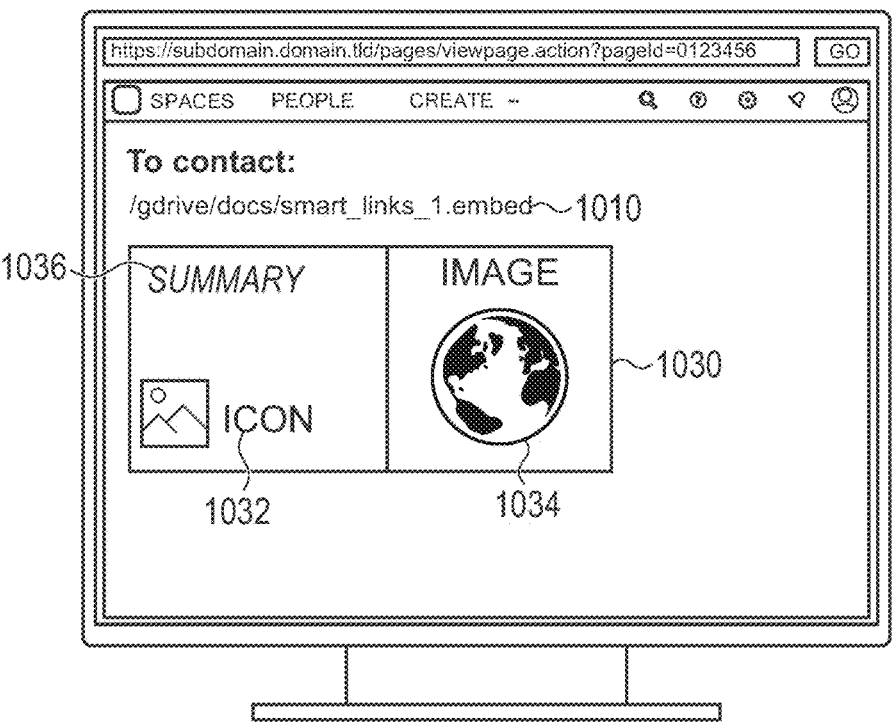

FIGS. 10A and 10B depict another example selectable graphical object that may be created using the techniques described herein. Specifically, as a result of the sequence of operations described above with respect to FIGS. 5A-5C, the system may generate a selectable embedded object 1030 using the link path 1010. Similar to previous examples discussed herein, the link path 1010 may be dynamically constructed using a series of API calls to an external platform service or target content source. In this example, the external platform service may be associated with a cloud-based document platform that is configured to store and share documents and other digital content for users that are registered with the document platform. The digital content may include word processing documents, images, movies, music, and other similar content.

In response to receiving hosted data corresponding to a final target or desired content, the system may cause the display of a link creation object 1020, which, when selected, causes the link path 1010 to be replaced with an embedded content object 1030 (shown in FIG. 10B). For purposes of illustration, the full link path is displayed in FIG. 10B in order to demonstrate the addition of the format designation (".embed") which results in the graphical selectable object being displayed as an embedded object.

As shown in FIG. 10B, the embedded object 1030 includes multiple regions and elements. Specifically, the embedded object 1030 includes an image 1034, which could also include a movie clip, animated GIF, or other type of graphical object. The embedded object 1030 also includes a summary 1036, which may include text extracted from the hosted data received from the external platform service. The embedded object 1030 may also include additional elements including an icon 1032 or other information associated with the external platform service. Other elements that may also be displayed in the embedded object 1030 include, without limitation, embedded graphs, charts, audio content, video content, and the like. In some cases, the embedded object 1030 includes an iframe, ajax, or other similar object that references content provided by an external website or URL.

Selection of the embedded object 1030 may redirect or otherwise result in the display of content provided by the external platform service, similar to other examples as described above with respect to previous figures. Other actions, operations, and functionality discussed with respect to previous examples, including the use of an object toolbar, user permissions for access, and actions performed in response to selection of the selectable graphical object, may also apply to the example of FIGS. 10A-10B, an explicit discussion of which is omitted to reduce redundancy.

Figure 11A:
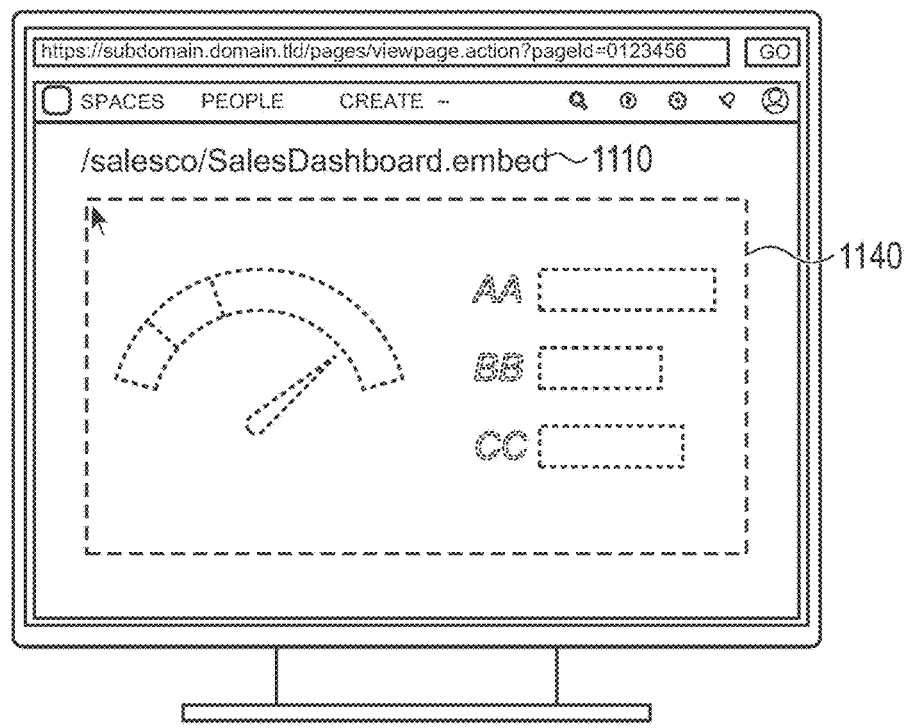
FIGS. 11A-11B depict another example selectable graphical object having embedded content hosted by an external platform service.
Figure 11B:
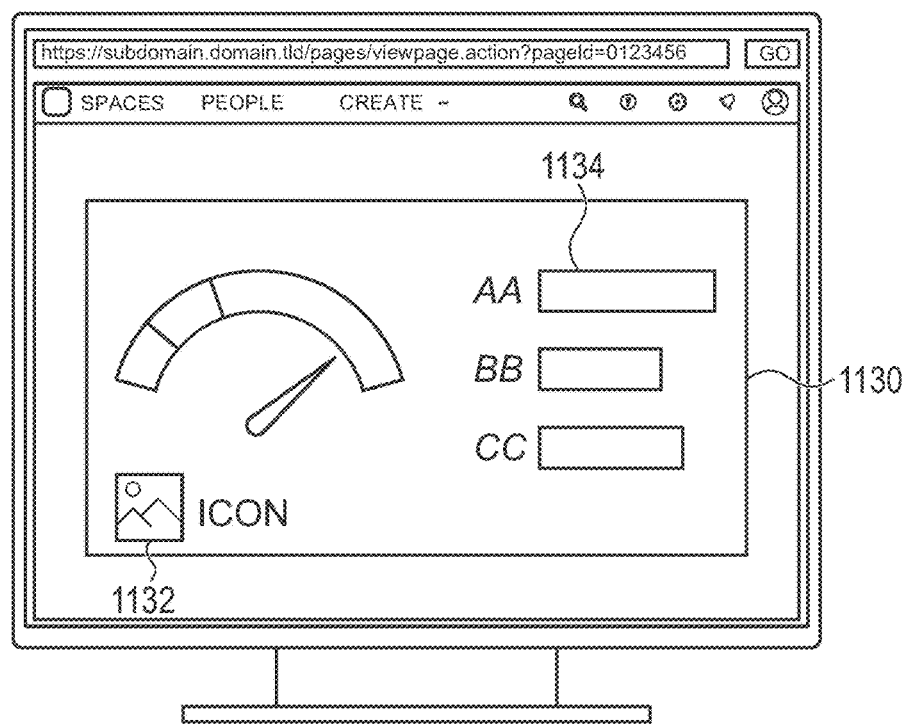

FIGS. 11A and 11B depict another example selectable graphical object that may be created using the techniques described herein. Specifically, as a result of the sequence of operations described above with respect to FIGS. 5A-5C, the system may generate a selectable embedded object 1130 using the link path 1110. Similar to previous examples discussed herein, the link path 1110 may be dynamically constructed using a series of API calls to an external platform service or target content source. In this example, the external platform service may be associated with a cloud-based document platform that is configured to store and share documents and other digital content for users that are registered with the document platform. The digital content may include word processing documents, images, movies, music, and other similar content.

In this example, a preview graphical object 1140 or transition graphical object is presented before the embedded object 1130 is inserted into the document. Specifically, in response to receiving hosted data corresponding to a final target or desired content, the system may cause the display of preview graphical object 1140, which may include at least a portion of the hosted data obtained from the external platform service. The preview graphical object 1140 may allow the user to view and evaluate the placement and format of the content to be inserted into the document. In some cases, the user may use the cursor or other selection technique to position the embedded object 1130 using the preview graphical object 1140 as a guide. The preview graphical object 1140 may be displayed in a ghosted or partially transparent format to allow the user to see content that would otherwise be hidden while placing the preview graphical object 1140.

In response to a selection of the preview graphical object 1140 or other user input, the link path 1110 will be replaced with an embedded content object 1130 (shown in FIG. 11B). For purposes of illustration, the full link path is displayed in FIG. 11A in order to demonstrate the addition of the format designation (".embed") which results in the graphical selectable object being displayed as an embedded object.

As shown in FIG. 11B, the embedded object 1130 includes multiple regions and elements. Specifically, the embedded object 1130 includes multiple graphical elements 1134, which may correspond to a chart, table, graph, or other visual representation of data obtained from the external platform services. Because the content is inserted as an embedded object 1130, the various graphical elements 1134 may be dynamically updated to reflect changes made to the host data or content provided by the external platform service. In some cases, the graphical elements 1134 and other embedded content is retrieved or refreshed every time the content displayed on the graphical user interface is initially displayed or loaded. The embedded object 1130 may also be configured to poll or query the external platform service in accordance with a predetermined interval in order to maintain current or accurate content. Similar to the other examples provided herein, the embedded object 1130 may also include additional elements including an icon 1132 or other information associated with the external platform service.

Selection of the embedded object 1130 may redirect or otherwise result in the display of content provided by the external platform service, similar to other examples as described above with respect to previous figures. Other actions, operations, and functionality discussed with respect to previous examples, including the use of an object toolbar, user permissions for access, and actions performed in response to selection of the selectable graphical object, may also apply to the example of FIGS. 11A-11B, an explicit discussion of which is omitted to reduce redundancy.

Figure 12:
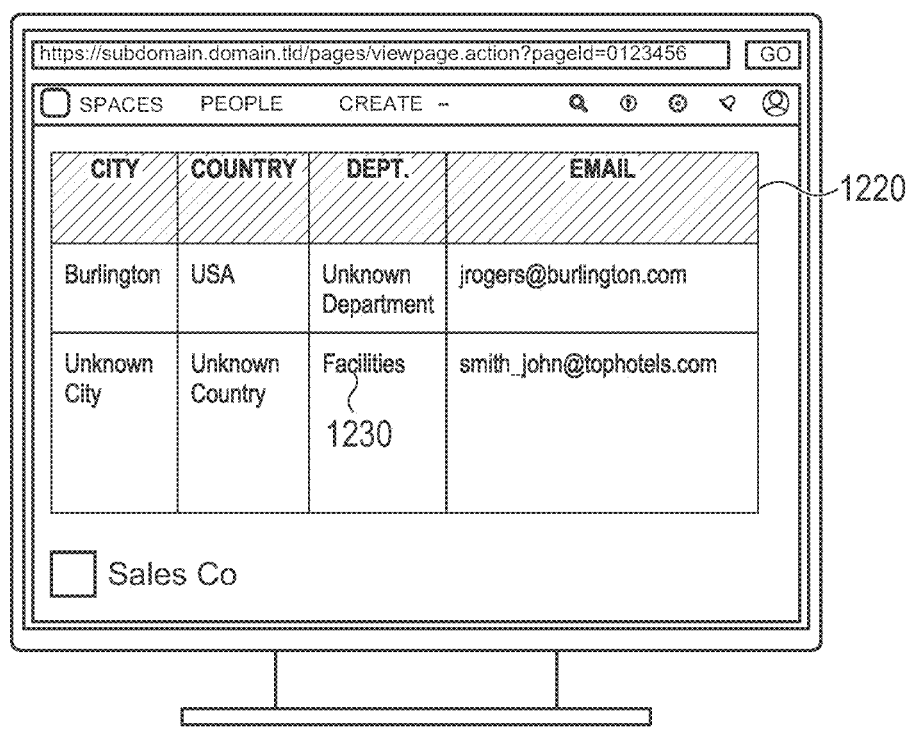
FIG. 12 depicts another example selectable graphical object having embedded content hosted by an external platform service.

FIG. 12 depicts another example embedded object 1220. Specifically, the embedded object 1220 includes an embedded view of a link table. The link table may be dynamically updatable to reflect changes made to the content or hosted data provided by the external platform services after the embedded object 1220 has been created. Similar to the previous example, the link table of the embedded object 1220 may include various selectable links or items 1230 that redirect the user or the graphical user interface to the external platform services or another service like a telephony or email service in response to a user selection. In contrast to the previous example of FIG. 7, the table of the embedded object 1220 may be updated to represent changes made to the hosted data. Similar to the other embedded examples provided herein, the table of the embedded object 1220 may be created using an iframe, ajax, or other similar approach that references content provided by an external website or URL.

Figure 13:
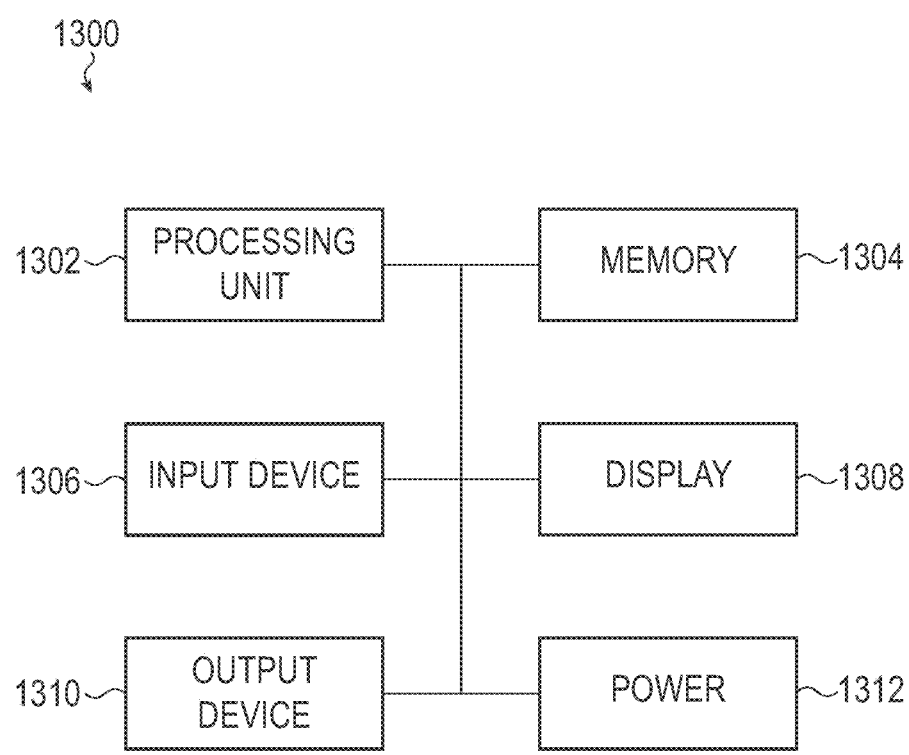
FIG. 13 depicts an example device in accordance with the embodiments described herein.

FIG. 13 depicts a sample electrical block diagram of an electronic device 1300 that may perform the operations described herein. The electronic device 1300 may in some cases take the form of any of the electronic devices described with reference to FIGS. 1-12, including client devices, and/or servers or other computing devices associated with the system 100. The electronic device 1300 can include one or more of a display 1308, a processing unit 1302, a power source 1312, a memory 1304 or storage device, input devices 1306, and output devices 1310. In some cases, various implementations of the electronic device 1300 may lack some or all of these components and/or include additional or alternative components.

The processing unit 1302 can control some or all of the operations of the electronic device 1300. The processing unit 1302 can communicate, either directly or indirectly, with some or all of the components of the electronic device 1300. For example, a system bus or other communication mechanism can provide communication between the processing unit 1302, the power source 1312, the memory 1304, the input device(s) 1306, and the output device(s) 1310.

The processing unit 1302 can be implemented as any electronic device capable of processing, receiving, or transmitting data or instructions. For example, the processing unit 1302 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements. It should be noted that the components of the electronic device 1300 can be controlled by multiple processing units. For example, select components of the electronic device 1300 (e.g., an input device 1306) may be controlled by a first processing unit and other components of the electronic device 1300 (e.g., the display 1308) may be controlled by a second processing unit, where the first and second processing units may or may not be in communication with each other.

The power source 1312 can be implemented with any device capable of providing energy to the electronic device 1300. For example, the power source 1312 may be one or more batteries or rechargeable batteries. Additionally or alternatively, the power source 1312 can be a power connector or power cord that connects the electronic device 1300 to another power source, such as a wall outlet.

The memory 1304 can store electronic data that can be used by the electronic device 1300. For example, the memory 1304 can store computer-readable instructions that, when executed by the processing unit 1302 may cause the device 1300 to perform one or more of the operations or functions described herein. The memory 1304 can also be used to store other electronic data or content including, for example, audio and video files, documents and applications, device settings and user preferences, timing signals, control signals, and data structures or databases. The memory 1304 can be configured as any type of memory. By way of example only, the memory 1304 can be implemented as random access memory, read-only memory, flash memory, removable memory, other types of storage elements, or combinations of such devices.

In various embodiments, the display 1308 provides a graphical output, for example associated with an operating system, user interface, and/or applications of the electronic device 1300 (e.g., documentation creation user interface, a chat user interface, an issue-tracking user interface, an issue-discovery user interface). In one embodiment, the display 1308 includes one or more sensors and is configured as a touch-sensitive (e.g., single-touch, multi-touch) and/or force-sensitive display to receive inputs from a user. For example, the display 1308 may be integrated with a touch sensor (e.g., a capacitive touch sensor) and/or a force sensor to provide a touch- and/or force-sensitive display. The display 1308 is operably coupled to the processing unit 1302 of the electronic device 1300.

The display 1308 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 1308 is positioned beneath and viewable through a cover that forms at least a portion of an enclosure of the electronic device 1300.

In various embodiments, the input devices 1306 may include any suitable components for detecting inputs. Examples of input devices 1306 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1306 may be configured to detect one or more particular types of input and provide a signal (e.g., an input signal) corresponding to the detected input. The signal may be provided, for example, to the processing unit 1302. As discussed above, in some cases, the input device(s) 1306 include a touch sensor (e.g., a capacitive touch sensor) integrated with the display 1308 to provide a touch-sensitive display. Similarly, in some cases, the input device(s) 1306 include a force sensor (e.g., a capacitive force sensor) integrated with the display 1308 to provide a force-sensitive display.

The output devices 1310 may include any suitable components for providing outputs. Examples of output devices 1310 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1310 may be configured to receive one or more signals (e.g., an output signal provided by the processing unit 1302) and provide an output corresponding to the signal.

In some cases, input devices 1306 and output devices 1310 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A computer-implemented method of rendering remotely hosted data in a graphical user interface, the computer-implemented method comprising:

instantiating a client application on a browser of a client device, the client application displaying the graphical user interface having a content-creation field configured to receive textual input;

in response to a user request to instantiate a link-creation module, querying a provider registry to obtain a set of registered content providers;

displaying a link-creation window, the link-creation window comprising at least one tab, the at least one tab associated with a respective content provider of the set of registered content providers;

in response to receiving a textual input from a user, analyzing the textual input and constructing an application programming interface call to the respective content provider using at least a portion of the textual input;

accessing, using the application programming interface call, hosted data hosted by at least one of the respective content providers from the set of respective content providers, the hosted data corresponding to the at least the portion of the textual input; and in response to a user selection of an element of at least one element, rendering a selectable graphical object within the content-creation field, the selectable graphical object including at least a portion of content items corresponding to the selected element.

2. The computer-implemented method of claim 1, wherein:
the at least a portion of content items corresponding to the selected element includes metadata; and
in response to a user selection of the selectable graphical object, the user is redirected to the content items.

3. The computer-implemented method of claim 1, wherein:
the textual input is a first partial textual input;
in response to receiving a second partial textual input, constructing a second application programming interface call using at least a portion of a second portion of the textual input;
accessing, using the second application programming interface call, second hosted data from the respective content provider; and
displaying at least one additional element that includes a portion of the second hosted data.

4. The computer-implemented method of claim 1, wherein:
the respective tab is a first tab;
the respective content provider is a first content provider;
in response to a user selection of a second tab within the link-creation window, determine a third application programming interface call based on a second content provider associated with the second tab; and
accessing, using the third application programming interface call, second hosted data from the second content provider, the second hosted data including metadata of one or more content items managed by the second content provider.

5. The computer-implemented method of claim 4, wherein in response to accessing the second hosted data, displaying within the second tab of the link-creation window, a third list of elements corresponding to the one or more content items managed by the second content provider.

6. The computer-implemented method of claim 1, wherein:
the selectable graphical object comprises embedded content hosted by the respective content provider; and
in response to a user selection of an item of the embedded content, accessing additional content items from the respective content provider.

7. The computer-implemented method of claim 1, wherein:
the selectable graphical object comprises a link-type selection control including a list of object control types; and
in response to a user selection of an object control type of the list of object control types, a display of the selectable graphical object is modified to correspond to the selected object control type.

8. The computer-implemented method of claim 7, wherein the list of object control types includes one or more of an inline object type, a card object type, and an embed object type.

9. The computer-implemented method of claim 1, wherein the content items comprise one or more of a cloud-stored document, an issue managed by an issue tracking platform, a project managed by a project management platform, or a page managed by a collaboration platform.

10. The computer-implemented method of claim 1, wherein the at least one tab is a set of tabs, the at least one element is a first set of elements, the respective content provider is a first content provider and corresponds to a first tab and to the application programming interface call; and further comprising:
in response to a user selection of a second tab, accessing, via a second application programming interface call, second hosted data hosted by a second content provider from the set of respective content providers and corresponding to the at least a portion of the textual input;
displaying a second set of elements corresponding to a the second content provider and corresponding to the textual input; and
in response to a user selection of a second element of the second set of elements, rendering a selectable object within the content-creation field, the selectable object including the at least a portion of a content of the second element.

11. A computer-implemented method of generating a selectable graphical object in a graphical user interface, the computer-implemented method comprising:
in response to a user request received at a content-creation field of the graphical user interface of a client application, causing display of a link-creation window comprising a list of elements corresponding to content items provided by content providers, distinct from a provider of the client application;
in response to a user input, determining an application programming interface call using at least a portion of the user input;
accessing, using the application programming interface call, content items managed by the content providers;
rendering, within the link-creation window, the list of elements, each element corresponding to at least a portion of the content items; and
in response to a user selection of an element of the list of elements, render a selectable graphical object within the content-creation field, the selectable graphical object including at least a portion of the content items from the selected element.

12. The computer-implemented method of claim 11, wherein:
the user request comprises a command-line input in the content-creation field;

in response to receiving the command-line input, querying a provider registry to obtain a set of registered content providers; and displaying a set of tabs, each tab corresponding to a registered content provider of the set of registered content providers.

13. The computer-implemented method of claim 11, wherein:

the link-creation window includes a link-creation input field; and in response to receiving a textual input to the link-creation input field, filter the list of elements based at least in part to a portion of the textual input.

14. The computer-implemented method of claim 11, wherein:

the link-creation window includes a link-creation input field; and in response to receiving a textual input to the link-creation input field, analyze the textual input and determine a second application programming interface call to a respective content provider using at least a portion of the textual input;

accessing, using the second application programming interface call, second hosted data hosted by the respective content provider, the second hosted data corresponding to one or more additional content items provided by the respective content provider and corresponding to the at least the portion of the textual input; and displaying within the link-creation window a second list of elements corresponding to the one or more additional content items provided by the respective content provider.

15. The computer-implemented method of claim 11, further comprising:

in response to a textual input from the user, retrieving user authorization schema for each of the content providers; and suppressing display of elements restricted to the user.

16. A computer-implemented method of rendering remotely hosted data in a graphical user interface, the computer-implemented method comprising:

instantiating a client application on a client device displaying the graphical user interface having a content-creation field configured to receive textual input via a keyboard of the client device;

in response to receiving a link-creation command, causing a display of a link-creation window overlapping the content-creation field of the graphical user interface generated by a client application on a client device, the link-creation window comprising a link-creation input field and a set of tabs, each tab associated with an external platform of a set of registered external platforms;

in response to receiving a textual input in the link-creation input field, analyzing the textual input and determining an application programming interface call to the respective external platform using at least a portion of the textual input;

accessing, using the application programming interface call, metadata hosted by the external platform, the metadata corresponding to one or more content items provided by the external platform;

causing display of a list of elements rendered from the content items, each element from the list of elements corresponding to at least a portion of the textual input; and in response to a user selection of an element of the list of elements, rendering a selectable graphical object within the content-creation field, the selectable graphical object including a least a portion of the content items provided by the external platform corresponding to the selected element.

17. The computer-implemented method of claim 16, wherein:

the selectable graphical object includes metadata of the at least of portion of the content items corresponding to the selected element; and in response to a user selection of the selectable graphical object, the user is redirected to the content items.

18. The computer-implemented method of claim 16, wherein:

the textual input is a first partial textual input;

in response to receiving a second partial textual input, constructing a second application programming interface call using at least a portion of a second portion of the textual input;

accessing, using the second application programming interface call, second metadata from a respective external platform; and displaying at least one additional element that includes a portion of the second metadata.

19. The computer-implemented method of claim 16, wherein:

the respective tab is a first tab;

the respective content provider is a first content provider;

in response to a user selection of a second tab within the link-creation window, determining a second application programming interface call based on a second content provider associated with the second tab; and accessing, using the second application programming interface call, second metadata from the second content provider, the second metadata corresponding to one or more content items managed by the second content provider.

20. The computer-implemented method of claim 16, wherein:

the selectable graphical object is a link table comprising selectable entries corresponding to at least one element of the list of elements having metadata hosted by an external platform.

* * * * *